US009168762B2

(12) United States Patent
Nakamura et al.

(10) Patent No.: US 9,168,762 B2
(45) Date of Patent: Oct. 27, 2015

(54) IMAGE FORMING SYSTEM HAVING INTERMEDIATE APPARATUS THAT DOES NOT HAVE A REVERSE UNIT

(71) Applicant: Konica Minolta, Inc., Tokyo (JP)

(72) Inventors: Hajime Nakamura, Hachioji (JP); Hideo Isohara, Fuchu (JP)

(73) Assignee: KONICA MINOLTA, INC. (JP)

( * ) Notice: Subject to any disclaimer, the term of this patent is extended or adjusted under 35 U.S.C. 154(b) by 0 days.

(21) Appl. No.: 14/215,170

(22) Filed: Mar. 17, 2014

(65) Prior Publication Data

US 2014/0293303 A1 Oct. 2, 2014

(30) Foreign Application Priority Data

Mar. 28, 2013 (JP) ................................ 2013-070655

(51) Int. Cl.
*G06K 15/00* (2006.01)
*B41J 3/54* (2006.01)
*G03G 15/00* (2006.01)

(52) U.S. Cl.
CPC .. *B41J 3/54* (2013.01); *G03G 15/00* (2013.01)

(58) Field of Classification Search
CPC .................................. B41J 3/54; G03G 15/00
USPC ................................................ 358/1.1-3.29
See application file for complete search history.

(56) References Cited

U.S. PATENT DOCUMENTS

2010/0329740 A1* 12/2010 Dobbertin et al. ............ 399/126
2013/0233191 A1* 9/2013 Mo et al. ....................... 101/490

FOREIGN PATENT DOCUMENTS

JP 2012-143964 A 8/2012
JP 2012150413 A 8/2012
JP 2012237924 A 12/2012

OTHER PUBLICATIONS

Japanese Abstract, Ueda Akio, Published on Feb. 8, 2012, Image Forming System.*
Japanese Notification of Reasons for Refusal corresponding to Patent Application No. 2013-070655; Dispatch Date: Mar. 3, 2015.

* cited by examiner

*Primary Examiner* — Marcellus Augustin
(74) *Attorney, Agent, or Firm* — Cantor Colburn LLP

(57) ABSTRACT

An image forming system of one aspect of the present invention includes a first image forming apparatus arranged on the upstream side in a sheet conveyance direction, a second image forming apparatus arranged on the downstream side in the sheet conveyance direction, and an intermediate apparatus arranged between the first image forming apparatus and the second image forming apparatus. The image forming system includes a sheet conveyance path through which a sheet is conveyed from the first image forming apparatus to the second image forming apparatus through the intermediate apparatus. The sheet conveyance path is formed so that the rear end of a sheet having stopped on the sheet conveyance path is located on the sheet conveyance path within the intermediate apparatus.

32 Claims, 14 Drawing Sheets

30

IMAGE FORMING SYSTEM HAVING INTERMEDIATE APPARATUS THAT DOES NOT HAVE A REVERSE UNIT

CROSS REFERENCES TO RELATED APPLICATIONS

The present invention contains subject matter related to Japanese Patent Application JP2013-070655, filed in the Japanese Patent Office on Mar. 28, 2013, respectively, the entire contents of which being incorporated herein by reference.

BACKGROUND OF THE INVENTION

1. Field of the Invention

The present invention relates to a tandem image forming system in which a plurality of image forming apparatuses is connected serially, and to an intermediate apparatus arranged between the image forming apparatuses.

2. Description of the Related Art

There is known a tandem image forming system (which may hereinafter be simply referred to as an "image forming system") configured by connecting two image forming apparatuses serially. With this image forming system, in the case where images are formed on both sides of a sheet, it is possible to form an image on a front side of the sheet by, for example, the image forming apparatus on the upstream side and to form an image on a back side of the sheet by the image forming apparatus on the downstream side. The respective image forming apparatuses share the processing to form images on the front side and the backside of the sheet, and thereby it is possible to improve productivity compared to the case where images are formed on both sides of a sheet by one image forming apparatus (e.g., see Patent Literature 1).

CITATION LIST

Patent Literature

[Patent Literature 1] Japanese Patent Laid-Open No. 2012-143964

SUMMARY OF THE INVENTION

Problems to be Solved by the Invention

However, a sheet on the front side of which an image is formed by the image forming apparatus on the upstream side is conveyed to the image forming apparatus on the downstream side to form an image on the back side. Then, in order to adjust a timing at which the image is transferred to the sheet within the image forming apparatus on the downstream side, a registration operation (skew correction) to temporarily stop the sheet is performed.

At this time, depending on the length of the sheet in the conveyance direction, a state where a part of the sheet is included within the image forming apparatus on the upstream side is brought about. Because of this, it is necessary to cause the image forming operation of the image forming apparatus on the upstream side to stand by or to take a long interval between sheets at the time of image formation, and therefore, productivity is reduced.

Because of the above-described circumstances, a method has been desired, which does not reduce productivity regardless of the length of a sheet in the conveyance direction in a tandem image forming system.

Means for Solving the Problems

An image forming apparatus according to one aspect of the present invention includes a first image forming apparatus arranged on the upstream side in the sheet conveyance direction, a second image forming apparatus arranged on the downstream side in the sheet conveyance direction, and an intermediate apparatus arranged between the first image forming apparatus and the second image forming apparatus.

The image forming system includes a sheet conveyance path through which a sheet is conveyed from the first image forming apparatus to the second image forming apparatus through the intermediate apparatus.

The sheet conveyance path is formed so that the rear end of a sheet having stopped on the sheet conveyance path is located on the sheet conveyance path within the intermediate apparatus.

An intermediate apparatus according to one aspect of the present invention is arranged between a first image forming apparatus and a second image forming apparatus and conveys a sheet conveyed from the first image forming apparatus to the second image forming apparatus.

A sheet conveyance path of the intermediate apparatus is formed so that the rear end of a sheet having stopped on the sheet conveyance path is located on the sheet conveyance path within the intermediate apparatus.

In the above-described configuration, the sheet conveyance path is formed so that the rear end of a sheet is located on the sheet conveyance path within the intermediate apparatus in the case where a sheet has stopped on the sheet conveyance path. Because of this, the sheet is not included in the first image forming apparatus on the upstream side, and therefore, does not affect the operation of the first image forming apparatus.

Effect of the Invention

According to the present invention, it is possible to operate an image forming system including a plurality of image forming apparatuses without reducing productivity regardless of the size of a sheet.

DESCRIPTION OF THE PREFERRED EMBODIMENTS

Hereinafter, embodiments for embodying the present invention are explained with reference to the attached drawings. In each drawing, the same symbol is attached to the common component and duplicated explanation is omitted.

[Entire Configuration of Image Forming System]

First, an outline of an image forming system according to an embodiment of the present invention is explained with reference to FIG. 1.

Figure 1:
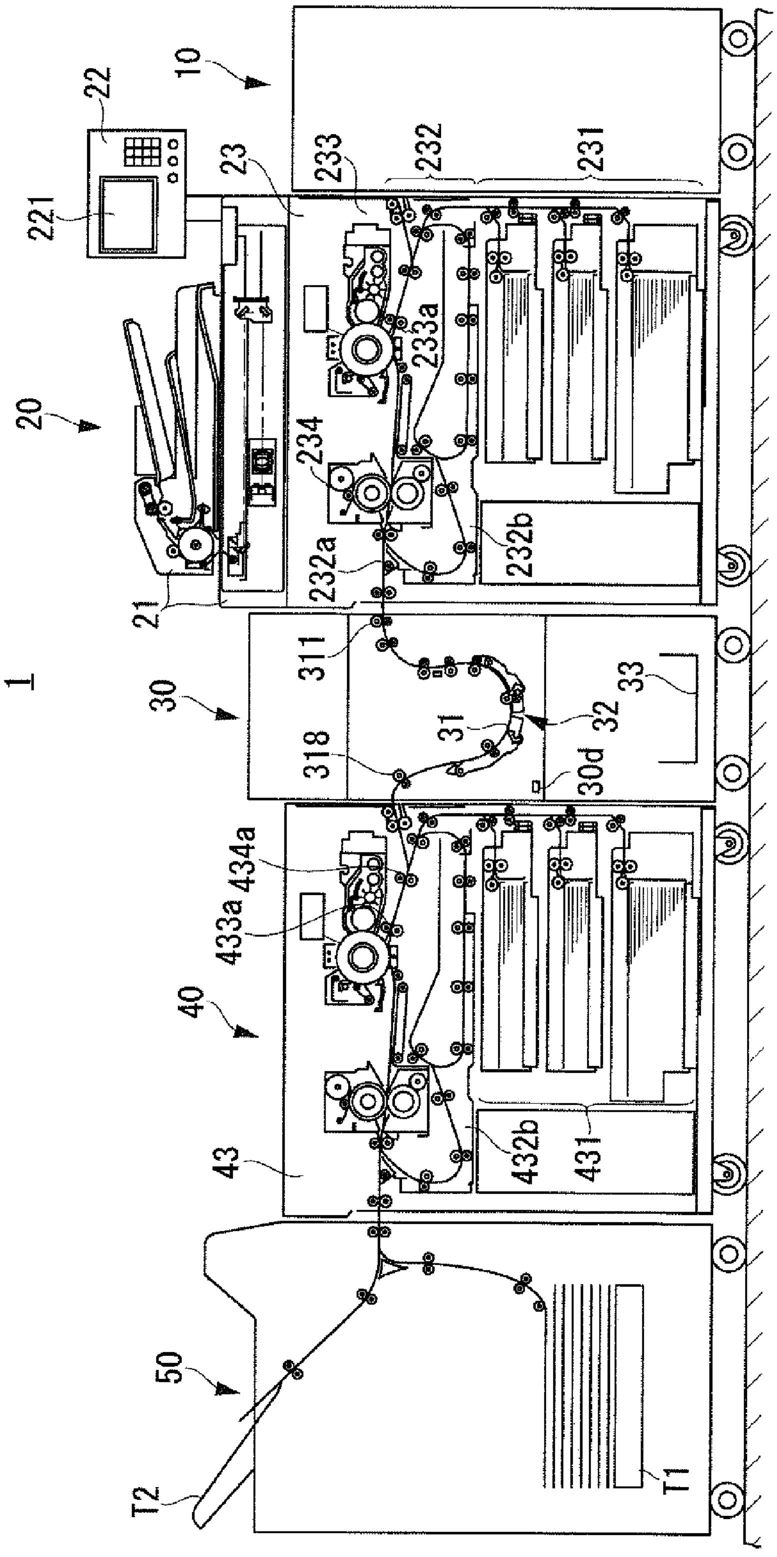
FIG. 1 is an outline diagram showing an entire configuration of an image forming system according to an embodiment of the present invention.

FIG. 1 is an outline diagram showing an entire configuration of the image forming system according to the embodiment of the present invention.

As shown in FIG. 1, an image forming system 1 has a serial tandem configuration in which a sheet feeding apparatus 10, a first image forming apparatus 20, an intermediate apparatus 30, a second image forming apparatus 40, a post-processing apparatus 50, etc., are linked serially from the upstream side of a sheet conveyance path.

The first image forming apparatus 20 and the second image forming apparatus 40 are set so that one of them is a main machine configured to comprehensively manage the image forming system 1 and the other is a sub machine configured to operate in accordance with instructions of the main machine when they are linked. In the present embodiment, it is assumed that the first image forming apparatus 20 provided on the upstream side in the sheet conveyance direction is set as the main machine and the second image forming apparatus 40 is set as the sub machine.

In the image forming system 1 in the present embodiment, in the case where a job in the both-side mode in which images are formed on both sides of a sheet is performed, the first image forming apparatus 20 functions as a first image forming apparatus configured to form an image on one side of the sheet and the second image forming apparatus 40 functions as a second image forming apparatus configured to form an image on the other side of the sheet.

In the case where the job in the both-side mode is performed, the first image forming apparatus 20 forms an image of the front side of a sheet conveyed from a feed unit within the sheet feeding apparatus 10 or the first image forming apparatus 20. Then, the front side and the backside of the sheet on the front side of which an image is formed are reversed by a reverse unit within the first image forming apparatus 20 and then is conveyed to the second image forming apparatus 40 through the intermediate apparatus 30, and an image is formed on the back side of the sheet and the sheet is conveyed to the post-processing apparatus 50.

In the case where a job in the one-side mode in which an image is formed on one side of a sheet is performed, the first image forming apparatus 20 forms an image on one of the sides of a sheet conveyed from the feed unit within the sheet feeding apparatus 10 or the first image forming apparatus 20. Then, the sheet on one side of which an image is formed is conveyed to the post-processing apparatus 50 through the intermediate apparatus 30 and the second image forming apparatus 40.

(Sheet Feeding Apparatus)

The sheet feeding apparatus 10 is also called a PFU (Paper Feed Unit) and includes a plurality of feed trays, a sheet feed unit, etc., including a feed roller, a separation roller, feed/separation rubber, a send-out roller, etc. In each feed tray, sheets identified in advance for each type of sheet (sheet type, basis weight, sheet size, etc.) are stacked and the sheets are conveyed one by one from the uppermost sheet to a sheet conveyance unit of the first image forming apparatus 20 by the sheet feed unit. Information of the type (sheet size, sheet type, etc.) of the sheet stacked in each feed tray is stored in a nonvolatile memory 251, to be described later, of the first image forming apparatus 20. The sheet feeding apparatus 10 functions as the feed unit of the first image forming apparatus 20.

(First Image Forming Apparatus)

The first image forming apparatus 20 reads an image from a document and forms an image of the read image on a sheet. Further, the first image forming apparatus 20 receives print data in the page description language format, such as the PDL (Page Description Language) format and the Tiff format, and print setting data from an external apparatus etc. and forms an image on a sheet based on the received print data, print setting data, etc. The first image forming apparatus 20 includes an image read unit 21, an operation display unit 22, a print unit 23, etc.

The image read unit 21 includes an automatic document feed unit also called an ADF (Auto Document Feeder) and a read unit and reads images of a plurality of documents based on setting information received by the operation display unit 22. The document placed on the document tray of the automatic document feed unit is conveyed onto a contact glass where the document is read, an image on one side or images on both sides are read by an optical system, and the image(s) of the document is read by a CCD (Charge Coupled Device) 211 (see FIG. 9). Here, images are also intended to include text data etc., such as characters and symbols, not limited to data of images, such as figures and photos.

The operation display unit 22 includes an LCD (Liquid Crystal Display) 221, a touch panel provided so as to cover the LCD 221, various kinds of switches and buttons, a ten-key, a group of operation keys, etc. The operation display unit 22 receives instructions from a user and outputs an operation signal of the instructions to a control unit 250, to be described later. Further, the operation display unit 22 displays an operation screen to display various kinds of setting screens through which various kinds of operation instructions and setting information are input and various kinds of processing results etc. on the LCD 221 in accordance with a display signal input from the control unit 250.

The print unit 23 performs electrophotographic image formation processing and includes each unit related to print output, such as a feed unit 231, a sheet conveyance unit 232, an image forming unit 233, and a fixing unit 234. For the print unit 23 of the present embodiment, an example is explained in which the electrophotographic system is applied, however, the example is not limited to this, and it may also be possible to apply the inkjet system, the thermal sublimation system, and other print systems.

The feed unit 231 includes a plurality of feed trays and a sheet feed unit including a feed roller, a separation roller, feed/separation rubber, a send-out roller, etc., provided for each feed tray. In each feed tray, sheets identified in advance for each type of sheet (sheet type, basis weight, sheet size, etc.) and which can be fed are stacked and the sheets are conveyed one by one from the uppermost sheet toward the sheet conveyance unit by the sheet feed unit. Information of the type (sheet type, basis weight, sheet size, etc.) of the sheet stacked in each feed tray is stored in the nonvolatile memory 251.

The sheet conveyance unit 232 conveys the sheet conveyed from the sheet feeding apparatus 10 or the feed unit 231 onto a sheet conveyance path leading to the image forming unit 233 through a plurality of intermediate rollers, registration rollers, etc. Then, the sheet is conveyed to a transfer position of the image forming unit 233 and further conveyed to the second image forming apparatus 40. The sheet stands by temporarily on the upstream side of a registration roller 233*a* configured to correct a bend and the conveyance to the downstream side of the registration roller 233*a* is resumed in accordance with the image formation timing.

Further, the sheet conveyance unit 232 includes a reverse unit 232*b* including a conveyance path switch unit 232*a*, a reverse roller, etc. The reverse unit 232*b* conveys the sheet having passed through the fixing unit 234 to an apparatus linked on the downstream side without reversing the front side and the back side of the sheet, or conveys the sheet to an apparatus linked on the downstream side after reversing the front side and the back side of the sheet through a switch back by the reverse roller etc. in accordance with the switching operation of the conveyance path switch unit 232*a*. The reverse unit 232*b* may include a circulation path unit configured to feed a sheet again to the image forming unit 233 of the first image forming apparatus 20 after reversing the front side and the back side of the sheet having passed through the fixing unit 234.

The image forming unit 233 includes a photosensitive drum, a charging apparatus, an exposing apparatus, a developing apparatus, a transfer apparatus, a cleaning apparatus, etc., and forms an image on the surface of a sheet based on print image data. In the case where the first image forming apparatus 20 forms a color image, the image forming unit 233 is provided for each color (Y, M, C, Bk).

In the image forming unit 233, the surface of the photosensitive drum charged by the charging apparatus is irradiated with light in accordance with print image data from the exposing apparatus and thus an electrostatic latent image is written. Then, to the surface of the photosensitive drum on which the electrostatic latent image is written, charged toner is attached by the developing apparatus and the electrostatic latent image is developed. The toner image attached onto the photosensitive drum is transferred to a sheet in the transfer position. After the toner image is transferred to the sheet, the residual charges, residual toner, etc., on the surface of the photosensitive drum are removed by the cleaning apparatus and the removed toner etc. is recovered into a toner recovery container.

The fixing unit 234 includes a fixing heater, a fixing roller, a fixing external heating unit, etc., and thermally fixes the toner image transferred to the sheet.

(Intermediate Apparatus)

The intermediate apparatus 30 is arranged on the downstream side of the first image forming apparatus 20 and on the upstream side of the second image forming apparatus 40 in the sheet conveyance direction. In the present embodiment, the intermediate apparatus 30 conveys a sheet conveyed from the first image forming apparatus 20 to the second image forming apparatus 40 in accordance with instructions from the second image forming apparatus 40.

The length of a sheet conveyance path 31 of the intermediate apparatus 30 is formed so that the rear end of a sheet does not come into contact with the first image forming apparatus 20 in the case where the intermediate apparatus 30 or the second image forming apparatus 40 instructs to stop the sheet within the sheet conveyance path 31. The sheet conveyance path 31 is formed so as to bend from the portion in the vicinity of a conveyance roller 311 on the side from which the sheet is conveyed in to the portion in the vicinity of a conveyance roller 318 on the side from which the sheet is discharged when viewed from the front side of the intermediate apparatus 30. In the present embodiment, the shape of the bend of the sheet conveyance path 31 is the shape of substantially a U-letter convex downward. By bending the sheet conveyance path 31, it is possible to secure the length of the sheet conveyance path 31 in the limited space. In other words, by bending the sheet conveyance path 31, it is possible to downsize the intermediate apparatus 30 while securing the length of the sheet conveyance path 31.

As the length necessary for the sheet conveyance path 31, mention is made of examples below.

First, in the case where there is a sheet stop position on the way of the sheet conveyance path of the second image forming apparatus 40, the length of the sheet conveyance path 31 is formed so that the rear end of the sheet is accommodated within the intermediate apparatus 30 with the tip end of the sheet having stopped within the second image forming apparatus 40 as a reference point.

Second, in the case where there is a sheet stop position on the way of the sheet conveyance path 31 of the intermediate apparatus 30, the length of the sheet conveyance path 31 is formed so that the rear end of the sheet is accommodated within the intermediate apparatus 30 with the tip end of the sheet having stopped within the intermediate apparatus 30 as a reference point.

Figure 2:
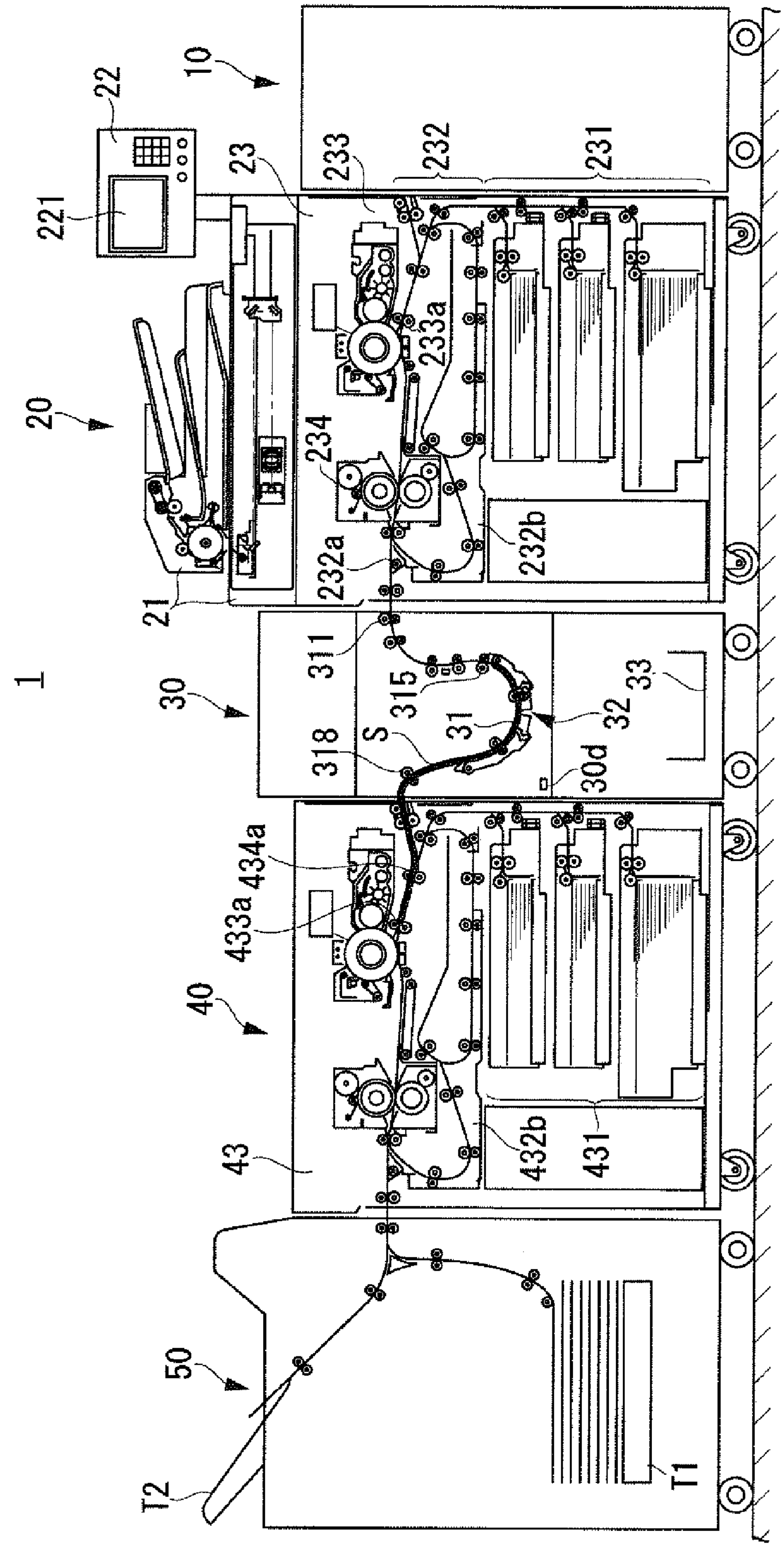
FIG. 2 is an explanatory diagram showing a relationship (first example) between a sheet stop position and a sheet conveyance path of an intermediate apparatus.

FIG. 2 is an explanatory diagram showing a relationship (first example) between a sheet stop position and the sheet conveyance path 31 of the intermediate apparatus 30.

In the example in FIG. 2, a position of a registration roller 433*a* of the second image forming apparatus 40 is set as the sheet stop position. In this case, the length of the sheet conveyance path 31 is formed so that the rear end of a sheet S is accommodated within the intermediate apparatus 30 with a nip portion of the registration roller 433*a* of the second image forming apparatus 40 as a reference point of the tip end of the sheet S. The rear end of the sheet is located on the way of the sheet conveyance path 31 of the intermediate apparatus 30, for example, in the vicinity of a conveyance roller 315.

Figure 3:
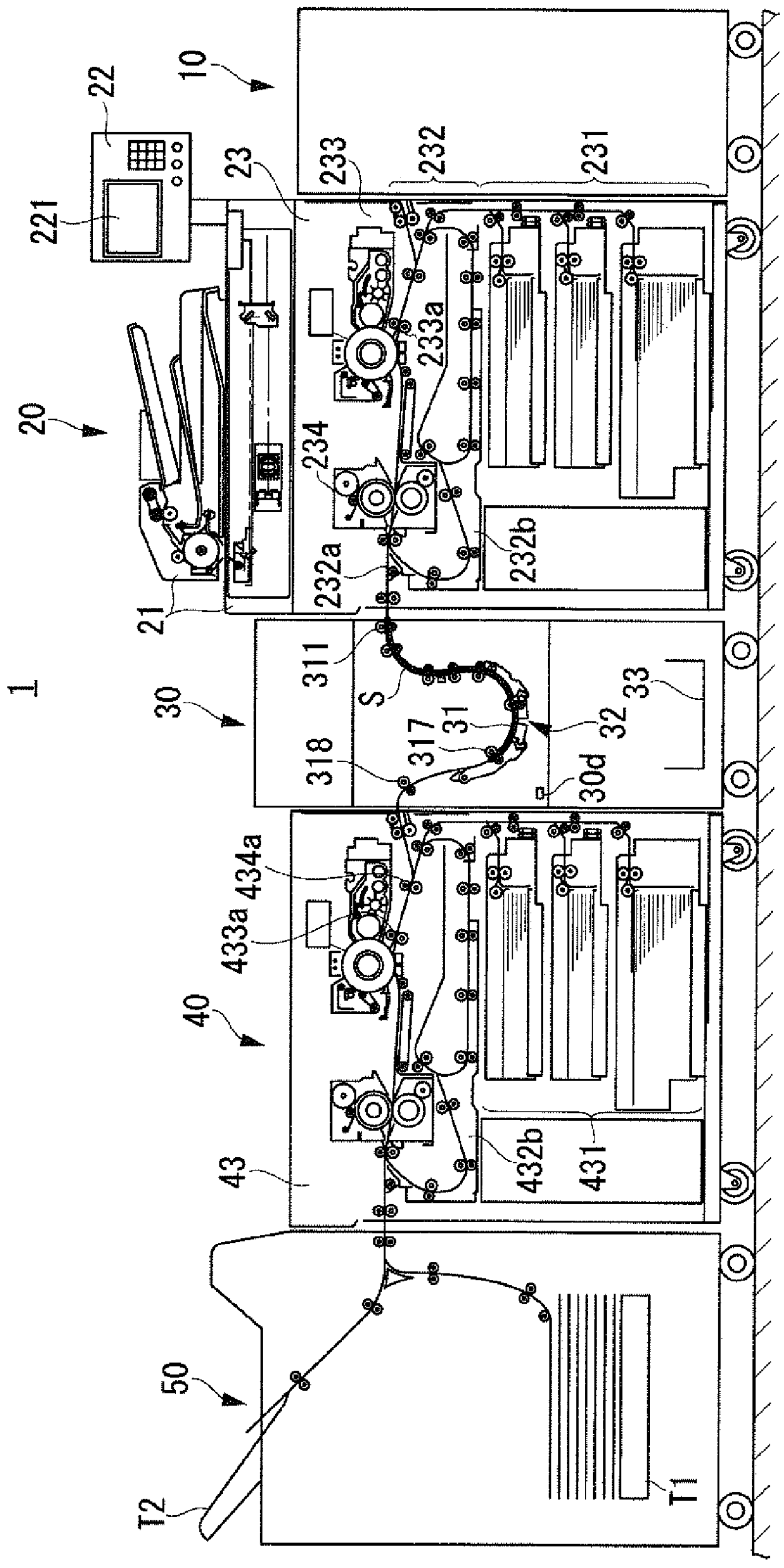
FIG. 3 is an explanatory diagram showing a relationship (second example) between the sheet stop position and the sheet conveyance path of the intermediate apparatus.

FIG. 3 is an explanatory diagram showing a relationship (second example) between the maximum length in the sheet feed direction and the sheet conveyance path 31 of the intermediate apparatus 30.

In the example in FIG. 3, a position of a registration roller 317 of the intermediate apparatus 30 is taken to be the sheet stop position. In this case, the length of the sheet conveyance path 31 is formed so that the rear end of the sheet S is accommodated within the intermediate apparatus 30 with a nip portion of the registration roller 317 of the intermediate apparatus 30 as a reference point of the tip end of the sheet S. The rear end of the sheet is located in the vicinity of the conveyance roller 311 on the sheet carry-in side of the sheet conveyance path 31 of the intermediate apparatus 30.

Further, the intermediate apparatus 30 includes an automatic path opening mechanism 32 (an example of the path opening mechanism) configured to open the sheet conveyance path 31 when a jam occurs. The jam refers to an abnormal stop of a sheet within the image forming system 1 for some reason and the sheet having stopped abnormally within the image forming system 1 is called a jammed sheet and the action by a user to remove the sheet having stopped abnormally and sheets other than the jammed sheet (remaining sheets) caused to stop while being conveyed is described as jam processing.

The configuration is such that when a jam occurs in the sheet conveyance path 31, the automatic path opening mechanism 32 opens a part of the sheet conveyance path 31 so that the sheets remaining in the sheet conveyance path 31 when a jam occurs are accommodated into an accommodation unit 33 arranged below. The intermediate apparatus 30 includes a door open/close detection sensor 30*d* configured to detect the open/close state of a front door, not shown, and to output the detection result to the second image forming apparatus 40. The opening by the automatic path opening mechanism 32 is performed, for example, when a signal output from the door open/close detection sensor 30*d* and indicating that the front door is opened is detected. When a user removes the jammed sheet or the sheet the conveyance of which has been stopped within the sheet conveyance path 31, in other words, performs the jam processing, it is possible to resume the operation of the image forming system 1.

(Second Image Forming Apparatus)

The second image forming apparatus 40 includes a print unit 43 etc. and forms an image on the surface of a sheet in cooperation with the first image forming apparatus 20.

A sheet conveyed from the first image forming apparatus 20 is conveyed to the registration roller 433*a* through a conveyance roller 434*a*. The sheet temporarily stands by on the upstream side of the registration roller 433*a* and the conveyance to the downstream side of the registration roller 433*a* is resumed in accordance with the image formation timing.

The print unit 43 included in the second image forming apparatus 40 includes each unit related to print output, such as a sheet conveyance unit including a feed unit 431 and a reverse unit 432*b*, an image forming unit, and a fixing unit, as in the print unit 23 included in the first image forming apparatus 20, and therefore, explanation is omitted.

(Post-Processing Apparatus)

The post-processing apparatus 50 is arranged on the downstream side of the second image forming apparatus in the sheet conveyance direction and includes various kinds of post-processing units, such as a sort unit, a staple unit, a punch unit, and a fold unit, a discharge tray (a large-capacity discharge tray T1 and a sub tray T2), etc., and performs various kinds of post-processing on the sheet conveyed from the second image forming apparatus 40 and discharges the sheet having been subjected to the post-processing to the large-capacity discharge tray T1 or the sub tray T2. The large-capacity discharge tray T1 has a stage that moves upward and downward and stores a number of sheets in the state of being stacked on the stage. Onto the sub tray T2, a sheet is discharged in the state of being exposed to the outside and being visible.

(Essential Units of Sheet Conveyance Path and Configuration Therearound)

Here, the configuration of the automatic path opening mechanism 32 of the intermediate apparatus 30 in the image forming system 1 with the above-described configuration is further explained.

Figure 4:
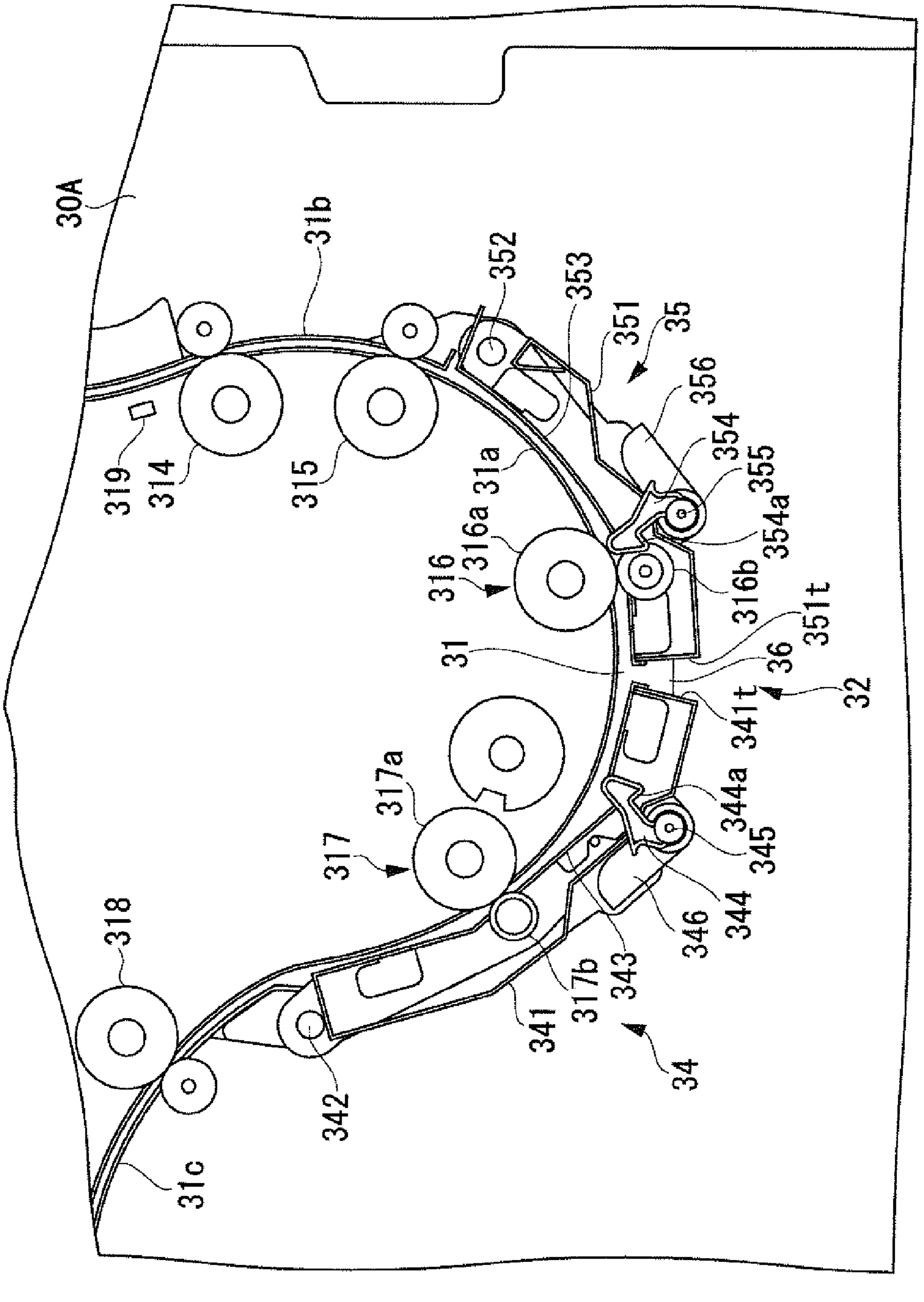
FIG. 4 is a configuration diagram showing essential units (lock state) of the sheet conveyance path of the intermediate apparatus.
Figure 5:
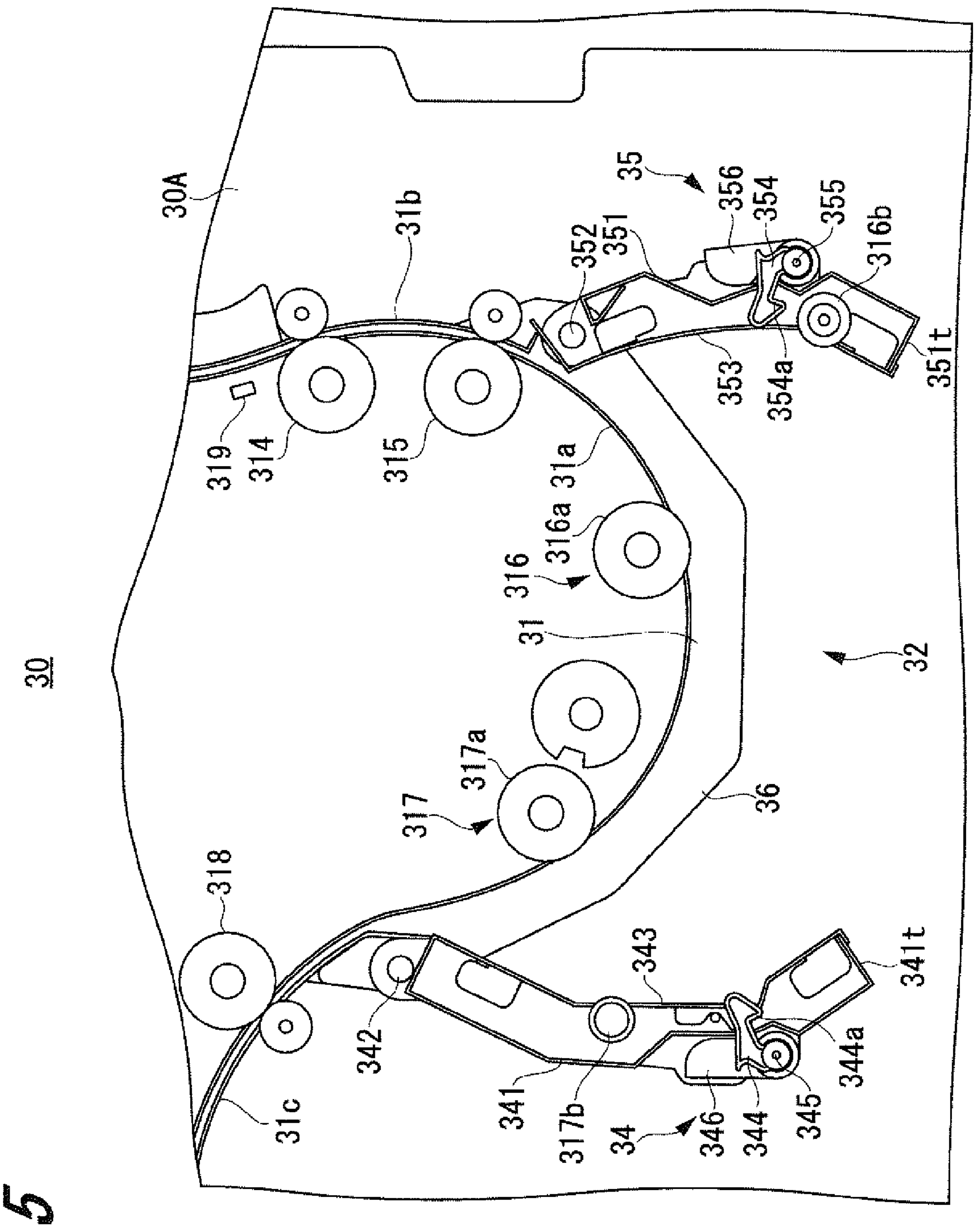
FIG. 5 is a configuration diagram showing the essential units (unlock state) of the sheet conveyance path of the intermediate apparatus.

FIG. 4 shows a configuration of essential units (lock state) of the sheet conveyance path 31 when the intermediate apparatus 30 is viewed from the front. FIG. 5 shows a configuration of essential units (unlock state) of the sheet conveyance path 31 when the intermediate apparatus 30 is viewed from the front.

As shown in FIG. 4, the intermediate apparatus 30 includes the sheet conveyance path 31 curved in the downward direction and the automatic path opening mechanism 32.

The sheet conveyance path 31 within the intermediate apparatus 30 includes an inner guide unit 31*a* in the form of a curved plate, fixed guide units 31*b* and 31*c* in the form of a curved plate provided so as to face the inner guide unit 31*a*, and a first movable guide unit 34 and a second movable guide unit 35 (one example of the movable guide unit) capable of rotating in the downward direction. The first movable guide unit 34 has a guide unit 343 in the form of a plate provided so as to oppose the inner guide unit 31*a* and the second movable guide unit 35 has a guide unit 353 in the form of a plate provided so as to face the inner guide unit 31*a*.

The fixed guide unit 31*b*, the guide unit 343, the guide unit 353, and the fixed guide unit 31*c* are arranged in this order from the upstream side in the sheet conveyance direction.

Along the sheet conveyance path 31, a plurality of rollers is arranged. In FIG. 4, a curl straightening roller 314, the conveyance roller 315, a conveyance roller 316, the registration roller 317, and the conveyance roller 318 are shown. The conveyance roller 316 also functions as a loop formation roller configured to form a loop in a sheet.

The inner guide unit 31*a* and the fixed guide units 31*b* and 31*c* are fixed to a back side 30A of the intermediate apparatus 30 directly or via an arbitrary member.

The inner guide unit 31*a* configures a fixed guide unit fixed on the inner side of the sheet conveyance path 31 curved in the downward direction. On the other hand, the fixed guide units 31*b* and 31*c*, the guide unit 343 of the first movable guide unit 34, and the guide unit 353 of the second movable guide unit 35 configure the outer guide unit of the sheet conveyance path 31.

The fixed guide units 31*b* and 31*c*, the guide unit 343 of the first movable guide unit 34, and the guide unit 353 of the second movable guide unit 35 are curved along the curved shape of the inner guide unit 31*a*. The shape of a first movable guide unit main body 341 is also curved along the curved shape of the inner guide unit 31*a*.

The first movable guide unit 34 includes the first movable guide unit main body 341 supported pivotally in a rotatable manner by a rotation shaft unit 342 provided at the end part on the upstream side in the sheet conveyance direction. The first movable guide unit main body 341 is driven to rotate so as to open the upstream side downward by a guide unit drive mechanism, not shown. The rotation shaft unit 342 is orthogonal to the sheet conveyance direction. The various kinds of rollers and one end part of the rotation shaft unit 342 are attached to a fixed plate 36 arranged on the back side 30A inside the intermediate apparatus 30. The various kinds of rollers and the other end part of the rotation shaft unit 342 are attached to a fixed plate 37 (see FIG. 6) arranged on the front side inside the intermediate apparatus 30.

In a predetermined position of the first movable guide unit main body 341, a locking member 344 is supported pivotally in a rotatable manner by a rotation shaft unit 345. Into one end part of the locking member 344, the rotation shaft unit 345 is inserted and at the other end part, a hook unit 344*a* in the shape of a hook is formed.

Figure 6:
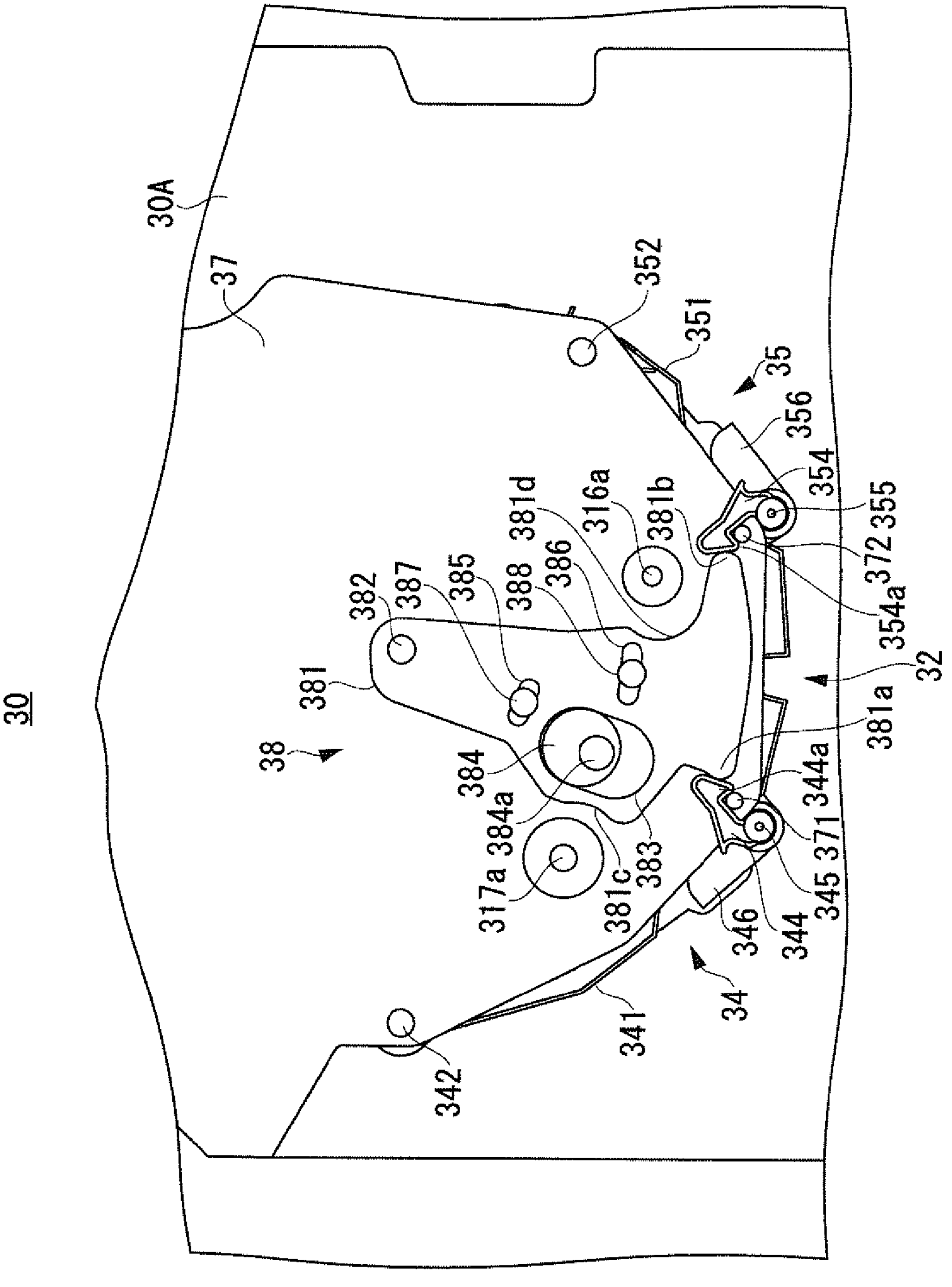
FIG. 6 is a first explanatory diagram of an unlocking operation of an automatic path opening mechanism.

By the hook unit 344*a* of the locking member 344 being hooked around a fixed pin 371 shown in FIG. 6, the first movable guide unit main body 341 is locked and thereby being held in a position (guide position) where sheet guiding is enabled (lock state).

When the first movable guide unit main body 341 and a second movable guide unit main body 351 are locked, a tip end part 341*t* of the first movable guide unit main body 341 and a tip end part 351*t* of the second movable guide unit main body 351 are arranged in the state of being close and facing each other.

On the other hand, in the case where the hook unit 344*a* of the locking member 344 is not hooked around the fixed pin 371, the upstream side of the first movable guide unit main body 341 rotates clockwise around the rotation shaft unit 342 by its own weight (open position) and the sheet conveyance path 31 is opened (unlock state) (see FIG. 5).

To the first movable guide unit main body 341, a driven roller 317*b* of the registration roller 317 is attached and the driven roller 317*b* moves accompanying the rotation of the first movable guide unit main body 341. In this manner, when the first movable guide unit main body 341 is opened, the driven roller 317*b* of the registration roller 317 withdraws integrally with the rotating motion of the first movable guide unit main body 341 and the pressure contact of the registration roller 317 is released.

The second movable guide unit 35 has a shape substantially in bilateral symmetry with the first movable guide unit 34 with the middle point of the sheet conveyance path 31 as a border and includes substantially the same components as those of the first movable guide unit 34.

The second movable guide unit main body 351 of the second movable guide unit 35 is supported pivotally in a rotatable manner by a rotation shaft unit 352 provided at the end part on the upstream side in the sheet conveyance direction. The second movable guide unit main body 351 is driven to rotate so as to open the downstream side downward by a guide unit drive mechanism, not shown. The rotation shaft unit 352 is orthogonal to the sheet conveyance direction. One end part of the rotation shaft unit 352 is attached to the fixed plate 36 arranged on the back side 30A inside the intermediate apparatus 30. The other end part of the rotation shaft unit 352 is attached to the fixed plate 37 (see FIG. 8) arranged on the front side of the intermediate apparatus 30.

In a predetermined position of the second movable guide unit main body 351, a locking member 354 is supported pivotally in a rotatable manner by a rotation shaft unit 355. Into one end part of the locking member 354, the rotation shaft unit 355 is inserted and at the other end part, a hook unit 354*a* in the form of a hook is formed.

By the hook unit 354*a* of the locking member 354 being hooked around a fixed pin 372 shown in FIG. 6, the second movable guide unit main body 351 is locked and thereby held in the position (guide position) where sheet guiding is enabled (lock state).

On the other hand, in the case where the hook unit 354*a* of the locking member 354 is not hooked around the fixed pin 372, the downstream side of the second movable guide unit main body 351 rotates counterclockwise around the rotation shaft unit 352 by its own weight (open position) and the sheet conveyance path 31 is opened (unlock state) (see FIG. 5).

To the second movable guide unit main body 351, a driven roller 316*b* of the conveyance roller 316 is attached and accompanying the rotation of the second movable guide unit main body 351, the driven roller 316*b* moves. In this manner, when the second movable guide unit main body 351 is opened, the driven roller 316*b* of the conveyance roller 316 withdraws integrally with the rotating motion of the second movable guide unit main body 351 and the pressure contact of the conveyance roller 316 is released.

An operation unit 346 supported pivotally by the rotation shaft unit 345 of the first movable guide unit main body 341 and an operation unit 356 supported pivotally by the rotation shaft unit 355 of the second movable guide unit main body 351 are utilized to return the first movable guide unit main body 341 and the second movable guide unit main body 351 to the lock positions, respectively. For example, when a user returns the first movable guide unit main body 341 and the second movable guide unit main body 351 to the lock positions, respectively, and then operates the operation unit 346 and the operation unit 356, the locking members 344 and 354 are hooked by the fixed pins 371 and 372, respectively, and the lock state is brought about. The driven roller 317*b* of the registration roller 317 is arranged in a position close to the rotation shaft unit 342 located closer to the downstream side than the operation unit 346.

As described above, the automatic path opening mechanism 32 according to the present embodiment has the first and second movable guide units 34 and 35 configured to open the sheet conveyance path 31. The first and second movable guide units 34 and 35 include the first and second movable guide unit main bodies 341 and 351 that rotate around the rotation shaft units 342 and 352 and include the guide units 343 and 353 configured to guide a sheet, and a locking mechanism configured to hold the first and second movable guide unit main bodies 341 and 351 in the positions where sheet guiding is enabled. Further, the first and second movable guide units 34 and 35 include an unlocking mechanism configured to release the lock state of the first and second movable guide unit main bodies 341 and 351 when a jam occurs, and the driven roller 317*b* of the registration roller 317.

Then, when a jam occurs, the first movable guide unit main body 341 is opened and the driven roller 317*b* of the registration roller 317 is moved integrally with the opening motion, and thereby the pressure contact of the registration roller 317 is released. At the same time, the second movable guide unit main body 351 is opened and the driven roller 316*b* of the conveyance roller 316 is moved integrally with the opening motion, and thereby the pressure contact of the conveyance roller 316 is released. With such a configuration, the sheets remaining in the sheet conveyance path 31 are accommodated into the accommodation unit 33 and it is possible for a user to remove these sheets in a collective manner.

On the upstream side of the conveyance roller 315 arranged on the sheet conveyance path 31, the curl straightening roller 314 (an example of the curl straightening unit) is provided. Further, on the upstream side of the curl straightening roller 314, a curl detection unit (not shown) configured to detect the direction and the degree of the curl of a sheet is arranged. The curl straightening roller 314 straightens the curl of a sheet using, for example, a pair of rollers having different hardness based on the detection result by the curl detection unit. The curl straightening unit may be one configured by using a roller and a belt as another example.

[Unlocking Operation of Automatic Path Opening Mechanism]

Next, the unlocking operation of the automatic path opening mechanism 32 is explained.

FIG. 6 is a first explanatory diagram of the unlocking operation of the automatic path opening mechanism 32.

Figure 7:
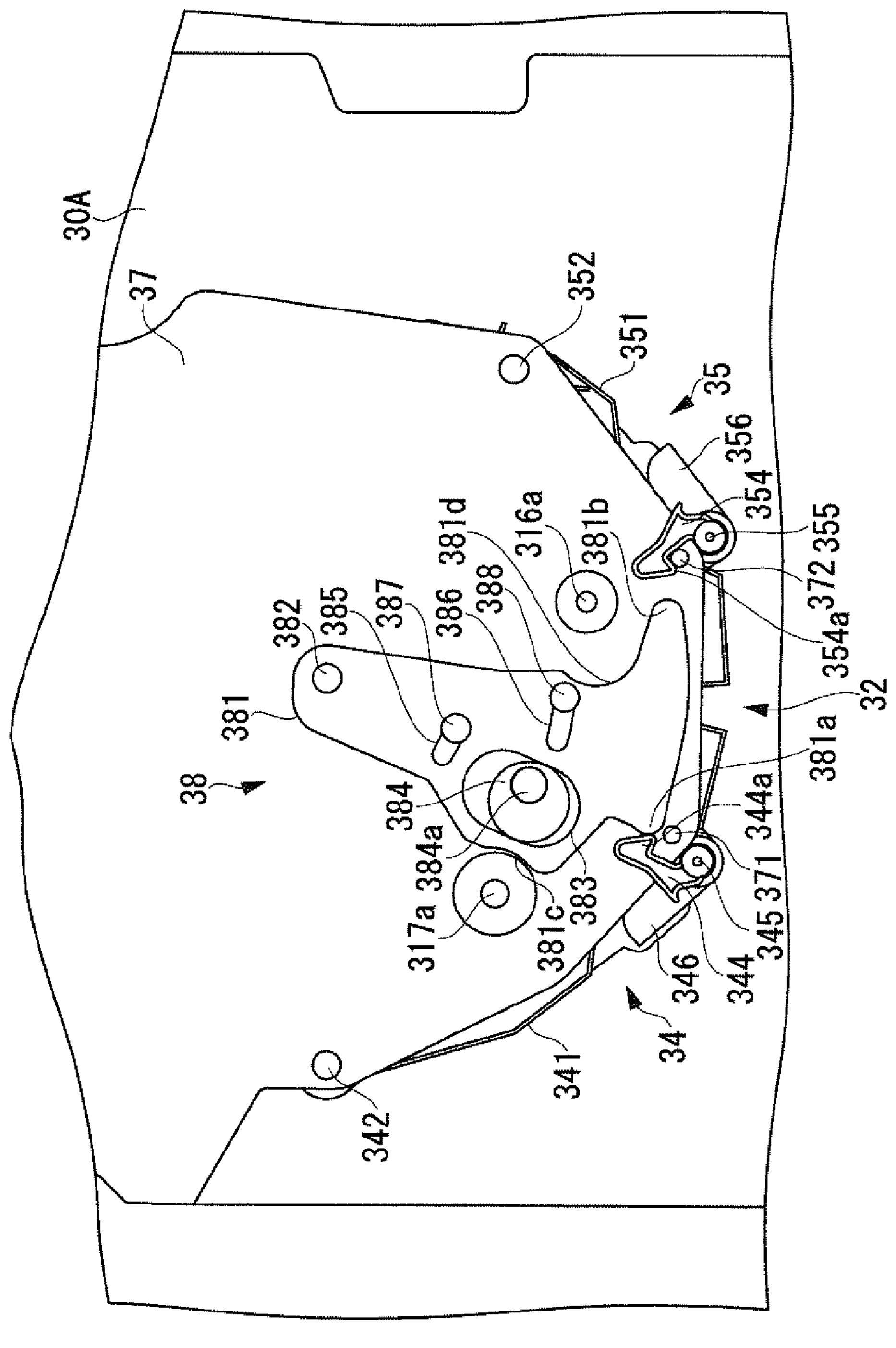
FIG. 7 is a second explanatory diagram of the unlocking operation of the automatic path opening mechanism.

FIG. 7 is a second explanatory diagram of the unlocking operation of the automatic path opening mechanism 32.

Figure 8:
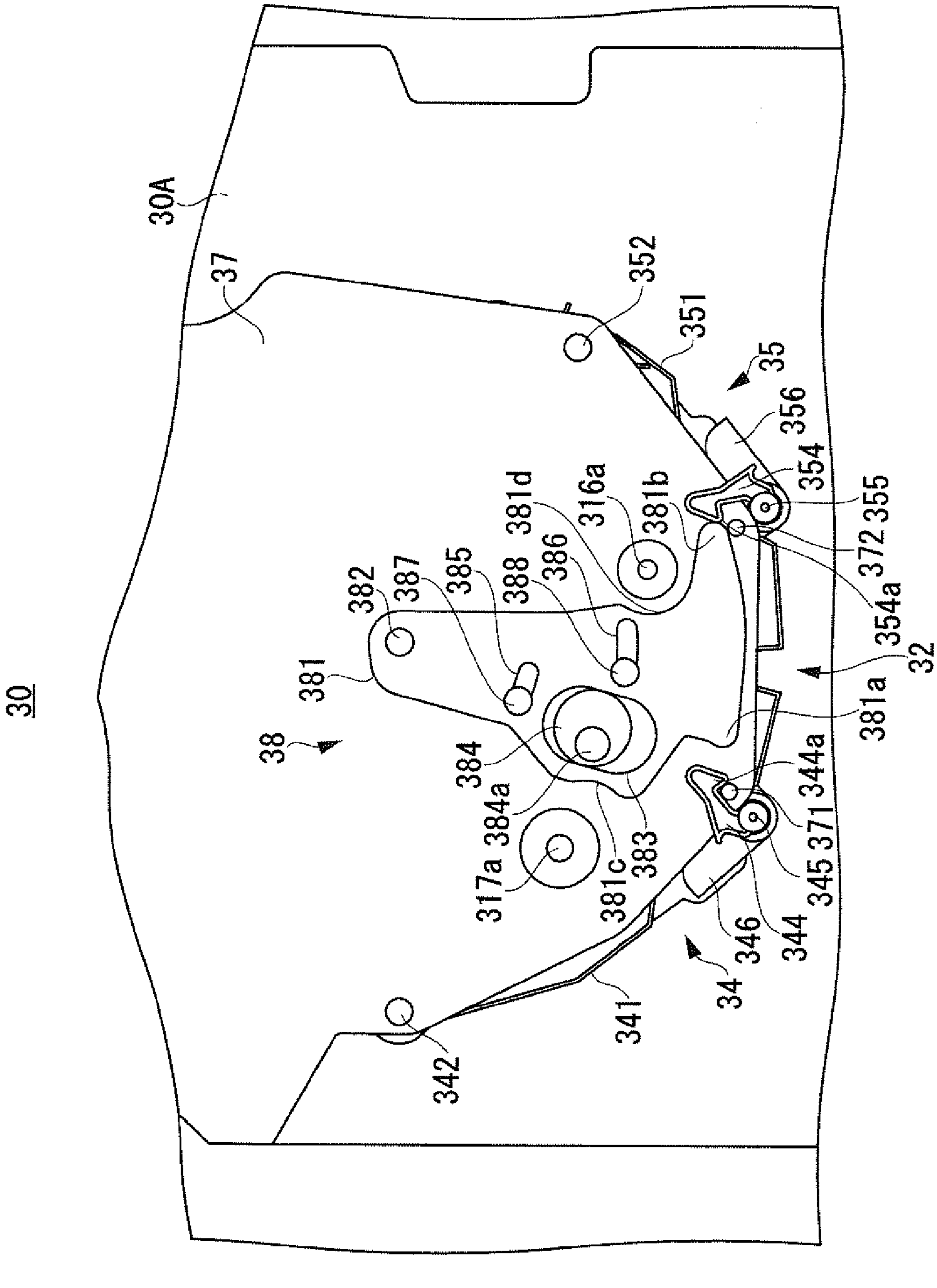
FIG. 8 is a third explanatory diagram of the unlocking operation of the automatic path opening mechanism.

FIG. 8 is a third explanatory diagram of the unlocking operation of the automatic path opening mechanism 32.

On the surface on the front side of the fixed plate 37 arranged on the front side of the intermediate apparatus 30, the fixed pins 371 and 372 are provided upright. As shown in FIG. 8, when the automatic path opening mechanism 32 is not open, i.e. the first movable guide unit 34 is in the lock state, the hook unit 344*a* of the locking member 344 included in the first movable guide unit 34 is hooked around the fixed pin 371. Similarly, the hook unit 354*a* of the locking member 354 included in the second movable guide unit 35 is hooked around the fixed pin 372.

An unlocking mechanism 38 includes a rocking cam 381 and an eccentric cam 384.

The rocking cam 381, having the shape of substantially a fan, is supported pivotally by a rotation shaft 382 located in the position corresponding to the pivot of the fan, and is displaced around the rotation shaft 382. In the rocking cam 381, a guide hole 383 to guide the eccentric cam 384 to a predetermined position and guide holes 385 and 386 to guide guide pins 387 and 388 are formed. The guide pins 387 and 388 are provided upright on the surface on the front side of the fixed plate 37. The guide pin 387 and the guide pin 388 are arranged in this order from the side near to the rotation shaft 382.

The eccentric cam 384 is driven to rotate around a rotation shaft 384*a* by an eccentric cam drive unit, not shown, under the control of a rocking cam drive control unit 471. As the eccentric cam drive unit, it is possible to adopt a combination of a motor and various kinds of mechanisms, and various kinds of actuators. When the eccentric cam 384 rotates, the distance from the rotation shaft 384*a* to the edge of the guide hole 383 changes and the eccentric cam 384 comes into contact with the edge of the guide hole 383. Thereby, the rocking cam 381 rocks to the right and left around the rotation shaft 382. The position of the rocking cam 381 shown in FIG. 6 is a home position (see FIG. 4) where the lock state of any of the first movable guide unit 34 and the second movable guide unit 35 is not released.

At the portion of the outer circumferential part of the rocking cam 381, which faces a drive roller 317*a* of the registration roller 317, a relief portion 381*c* formed into a concave shape so as to fit the curved surface of the drive roller 317*a* is formed. Further, at the portion of the outer circumferential part of the rocking cam 381, which faces a drive roller 316*a* of the conveyance roller 316, a relief portion 381*d* formed into a concave shape so as to fit the curved surface of the drive roller 316*a* is formed. Due to these relief portions 381*c* and 381*d*, even if the rocking cam 381 rocks to the right and left, the outer circumferential part of the rocking cam 381 does not come into contact with each drive roller. Adopting the shape such as this leads to downsizing of the rocking cam 381.

As shown in FIG. 7, when the eccentric cam 384 rotates and the diameter on the left side of the rotation shaft 384*a* becomes long, the rocking cam 381 is displaced in the leftward direction. Due to this, a protrusion 381*a* of the rocking cam 381 pushes out the hook unit 344*a* of the locking member 344 included in the first movable guide unit 34. By the push-out of the hook unit 344*a* of the locking member 344, the lock state of the first movable guide unit 34 is released and the first movable guide unit main body 341 is opened by its own weight (see FIG. 5).

As shown in FIG. 8, when the eccentric cam 384 further continues to rotate from the state shown in FIG. 7 and the diameter on the right side of the rotation shaft 384*a* of the eccentric cam 384 becomes long, the rocking cam 381 is displaced in the rightward direction. Due to this, a protrusion 381*b* of the rocking cam 381 pushes out the hook unit 354*a* of the locking member 354 included in the second movable guide unit 35. By the push-out of the hook unit 354*a* of the locking member 354, the lock state of the second movable guide unit 35 is released and the second movable guide unit main body 351 is opened by its own weight (see FIG. 5).

After the push-out of the hook unit 354*a* of the locking member 354 included in the second movable guide unit 35 by the rightward displacement of the rocking cam 381, the eccentric cam 384 rotates to and stops at the home position (see FIG. 6) by a phase actuator on an eccentric cam drive shaft, not shown.

As above, with reference to FIG. 6 to FIG. 8, the unlocking operation of the automatic path opening mechanism 32 using the rocking cam 381 arranged on the front side of the intermediate apparatus 30 is explained, but the automatic path opening mechanism 32 including the rocking cam 381 is arranged also on the back side 30A inside the intermediate apparatus 30. However, it is sufficient for the automatic path opening mechanism 32 including the rocking cam 381 to be arranged at least either on the back side 30A or on the front side.

[Internal Configuration of First Image Forming Apparatus]

Figure 9:
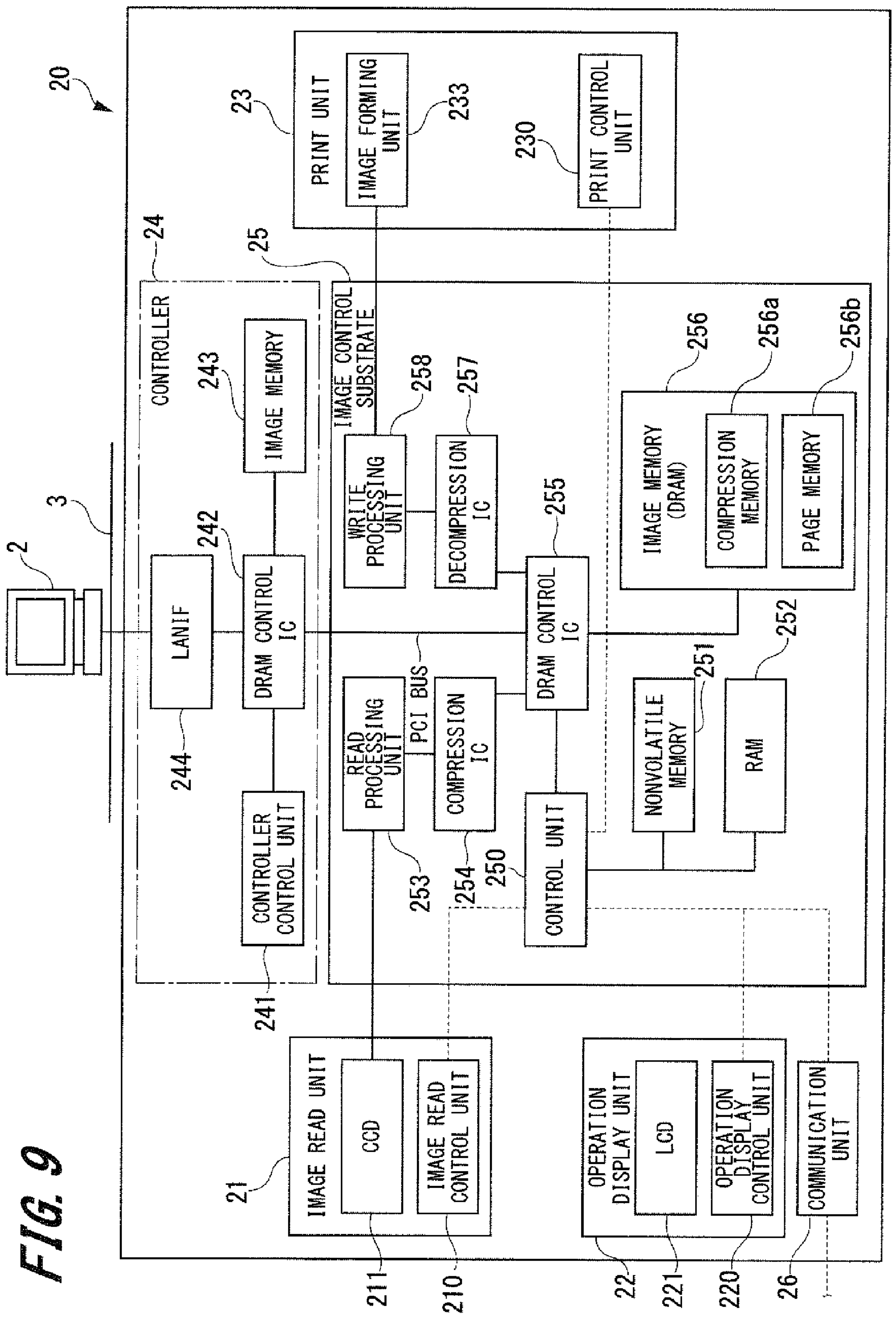
FIG. 9 is a block diagram showing an internal configuration of a first image forming apparatus of the image forming system.

FIG. 9 is a block diagram showing an internal configuration of the first image forming apparatus 20 of the image forming system 1.

As shown in FIG. 9, the first image forming apparatus 20 includes the image read unit 21, the operation display unit 22, the print unit 23, a controller 24, an image control substrate 25, a communication unit 26, etc. The first image forming apparatus 20 is connected with an external apparatus 2 on a network 3 via a LANIF (Local Area Network Interface) 244 of the controller 24 so that data can be transmitted and received to and from each other.

The image read unit 21 includes the above-described automatic document feed unit, the read unit, and an image read control unit 210. The image read control unit 210 controls the automatic document feed unit, the read unit, etc., based on instructions from the control unit 250 to implement the scanner function to read images of a plurality of documents. The analog image data read by the image read unit 21 is output to a read processing unit 253 and subjected to A/D conversion and then various kinds of image processing in the read processing unit 253.

The operation display unit 22 includes the above-described LCD 221, the touch panel, etc., and an operation display control unit 220. The operation display control unit 220 displays an operation screen to display various kinds of screens through which various kinds of setting conditions are input and various kinds of processing results etc. on the LCD in accordance with the display signal input from the control unit 250. Further, the operation display control unit 220 outputs the operation signal input through the various kinds of switches and buttons, the ten-key, the operation key group or the touch panel, etc., to the control unit 250.

The print unit 23 includes each unit related to print output, such as the feed unit 231, the sheet conveyance unit 232, the image forming unit 233, and the fixing unit 234 described above (see FIG. 1), and a print control unit 230. The print control unit 230 controls the operation of each unit of the print unit 23, such as the image forming unit 233, in accordance with instructions from the control unit 250 and causes each unit to form an image based on print image data input from a write processing unit 258.

The controller 24 is configured to manage and control data input from the external apparatus 2 connected to the network 3 to the image forming system 1. The controller 24 receives data to be printed (print data and print setting data) from the external apparatus 2 and transmits image data generated by developing the print data and print setting data to the image control substrate 25.

The controller 24 includes a controller control unit 241, a DRAM (Dynamic Random Access Memory) control IC 242, an image memory 243, the LANIF 244, etc.

The controller control unit 241 comprehensively controls the operation of each unit of the controller 24 and generates image data in the bitmap format by developing print data input from the external apparatus 2 via the LANIF 244.

The DRAM control IC 242 controls transfer of print data received by the LANIF 244 to the controller control unit 241, and write/read of image data and print setting data to and from the image memory 243. Further, the DRAM control IC 242 is connected with a DRAM control IC 255 of the image control substrate 25 via a PCI (Peripheral Components Interconnect) bus. The DRAM control IC 242 reads image data to be printed and print setting data from the image memory 243 in accordance with instructions from the controller control unit 241 and outputs the data to the DRAM control IC 255.

The image memory 243 includes a volatile memory, such as a DRAM, and temporarily stores image data and print setting data.

The LANIF 244 is a communication interface to connect to the network 3, such as a LAN, such as an NIC (Network Interface Card) and a modem, and receives print data and print setting data from the external apparatus 2. The received print data and print setting data are output to the DRAM control IC 242.

The image control substrate 25 includes the control unit 250, the nonvolatile memory 251, a RAM (Random Access Memory) 252, the read processing unit 253, a compression IC 254, the DRAM control IC 255, an image memory 256, a decompression IC 257, the write processing unit 258, etc.

The control unit 250 includes a CPU (Central Processing Unit) etc. and reads a program specified from among the system program and various kinds of application programs stored in the nonvolatile memory 251 and develops the program on the RAM 252. Then, the control unit 250 performs various kinds of processing in cooperation with the program developed on the RAM 252 and concentratedly controls each unit of the first image forming apparatus 20.

Further, because the first image forming apparatus 20 is set as the main machine, the control unit 250 receives a signal indicating the state of each apparatus from each apparatus configuring the image forming system 1 via the communication unit 26. Then, the control unit 250 comprehensively controls the whole of the image forming system 1 based on the signal indicating the state of each apparatus. For example, in the case where a signal indicating an error (JAM occurrence, out of sheet, toner shortage etc.) within the second image forming apparatus 40 is received, the control unit 250 generates a display signal and an operation instruction signal in accordance with the error and transmits the generated signal to the operation display unit 22, the second image forming apparatus, etc.

Further, the control unit 250 generates job data and compressed image data based on the image data and print setting data input from the external apparatus 2 via the controller 24 or the image data input from the image read unit 21 and setting information set by the operation display unit 22. Then, the control unit 250 executes the job in cooperation with the second image forming apparatus 40 based on the generated job data and compressed image data.

A job is a series of operations related to image formation and for example, in the case where a copy including a document of predetermined pages is created, a series of operations related to image formation of the document of predetermined pages is one job. The data to perform the operation of this job is job data.

Job data includes job information and page information.

The job information is information common to all pages. For example, the job information includes the number of copies set in the job, the discharge tray, applied functions (aggregation, repeat, etc.), color/monochrome, etc.

The page information is associated with compressed image data of each page and related to the associated compressed image data. For example, the page information includes the page number, the image size (height, length), the image orientation, the image width, the image rotation angle, the type of sheet on which an image is formed, the feed tray where the sheet is stacked, the print mode (both-side mode/one-side mode), the storage address of the compressed image data, etc.

The nonvolatile memory 251 stores various kinds of processing programs, various kinds of data, etc., related to image formation. Further, the nonvolatile memory 251 stores information of the type of sheet stacked in each of the feed trays included in the sheet feeding apparatus 10, the sheet feeding unit of the first image forming apparatus 20, and the sheet feeding unit of the second image forming apparatus 40, respectively.

The RAM 252 forms a work area for temporarily storing various kinds of programs executed by the control unit 250, various kinds of data related to these programs, etc.

Further, the RAM 252 temporarily stores job data generated by the control unit 250 based on image data and print setting data input from the controller 24 or image data input from the image read unit 21 and setting information set by the operation display unit 22 when the image data is acquired.

The read processing unit 253 generates digital image data after performing various kinds of processing, such as analog processing, A/D conversion processing, and shading processing, on analog image data input from the image read unit 21. The generated image data is output to the compression IC 254.

The compression IC 254 performs compression processing on the input digital image data and outputs the data to the DRAM control IC 255.

The DRAM control IC 255 controls compression processing of image data by the compression IC 254 and decompression processing of compressed image data by the decompression IC 257 and also controls input and output of image data to and from the image memory 256 in accordance with instructions from the control unit 250.

For example, when instructions to save image data read by the image read unit 21 are input from the control unit 250, the DRAM control IC 255 causes the compression IC 254 to perform compression processing of image data input to the read processing unit 253 and causes a compression memory **256*a* of the image memory 256 to store compressed image data. Further, when image data is input from the DRAM control IC 242 of the controller 24, the DRAM control IC 255 causes the compression IC 254 to perform compression processing of the image data and causes the compression memory 256*a* of the image memory 256** to store compressed image data.

Further, when instructions to print out compressed image data stored in the compression memory **256*a* are input from the control unit 250, the DRAM control IC 255 reads compressed image data from the compression memory 256***a*, causes the decompression IC 257 to perform decompression processing, and causes a page memory 256*b* to store the data. Furthermore, when instructions to print out image data stored in the page memory 256*b* are input, the DRAM control IC 255 reads image data from the page memory 256*b* and outputs the data to the write processing unit 258.

The image memory 256 includes the compression memory 256*a* and the page memory 256*b*, both including a DRAM (Dynamic RAM). The compression memory 256*a* is a memory for storing compressed image data and the page memory 256*b* is a memory for temporarily storing image data for print out or for temporarily storing image data received from the controller before compression.

The decompression IC 257 performs decompression processing on compressed image data.

The write processing unit 258 generates print image data for image formation based on image data input from the DRAM control IC 255 and outputs the data to the print unit 23.

The communication unit 26 is a communication interface for connecting to a network to which each apparatus configuring the image forming system 1 is connected. For example, the communication unit 26 communicates with the second image forming apparatus 40 using an NIC (Network Interface Card) etc. and also performs serial communication with the sheet feeding apparatus 10 and the intermediate apparatus 30.

[Internal Configuration of Second Image Forming Apparatus]

Figure 10:
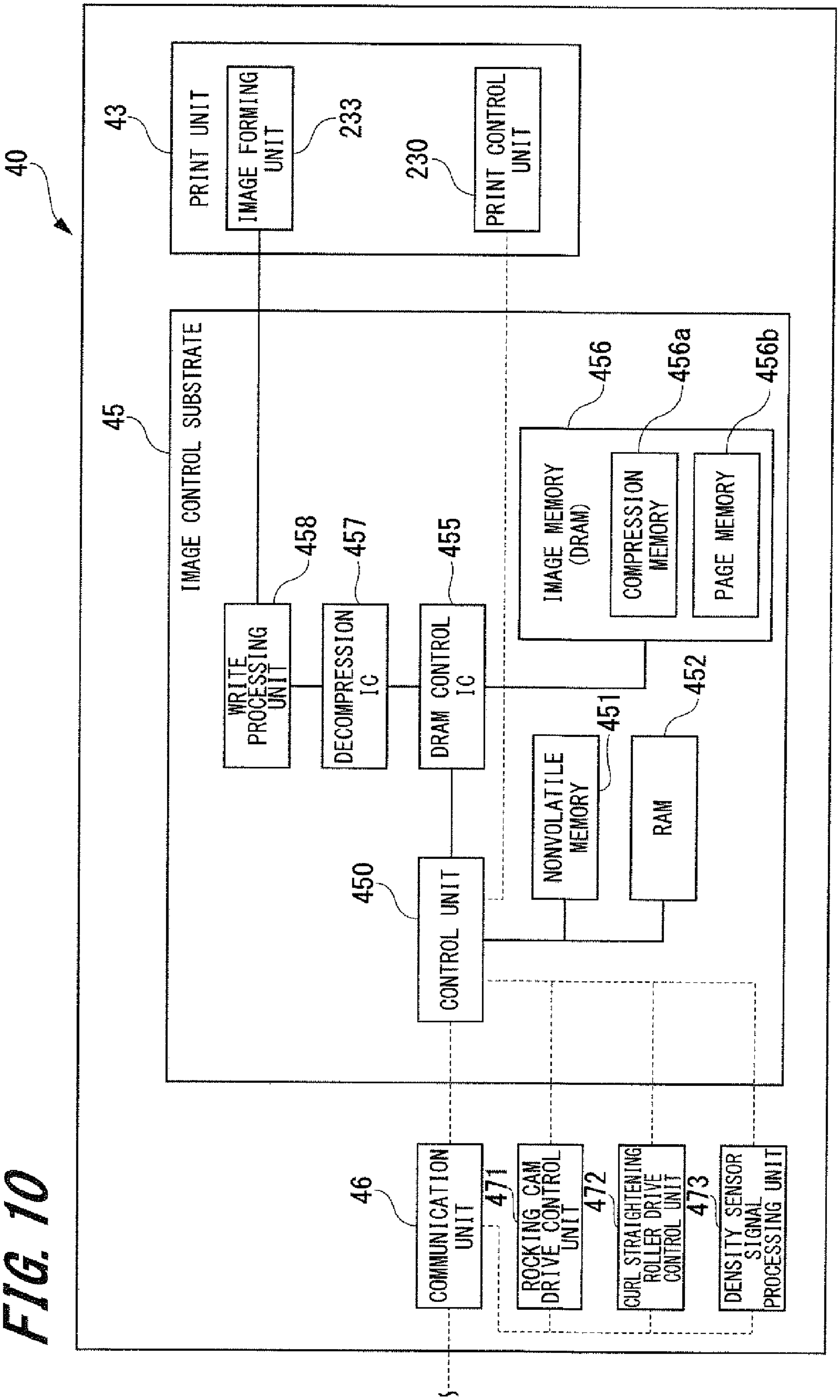
FIG. 10 is a block diagram showing an internal configuration of a second image forming apparatus of the image forming system.

FIG. 10 is a block diagram showing an internal configuration of the second image forming apparatus 40 of the image forming system 1.

As shown in FIG. 10, the second image forming apparatus 40 includes the print unit 43, an image control substrate 45, a communication unit 46, etc.

The print unit 43 has the same configuration as that of the print unit 23 of the first image forming apparatus 20, and therefore, explanation is omitted.

The image control substrate 45 includes a control unit 450, a nonvolatile memory 451, a RAM 452, a DRAM control IC 455, an image memory 456, a decompression IC 457, a write processing unit 458, etc.

The control unit 450 includes a CPU etc. and reads a program specified from among the system program and various kinds of application programs stored in the nonvolatile memory 451 and develops the program on the RAM 452. Then, the control unit 250 performs various kinds of processing in cooperation with the program developed on the RAM 452 and concentratedly controls each unit of the second image forming apparatus 40 and the intermediate apparatus 30.

The nonvolatile memory 451 stores various kinds of processing programs, various kinds of data, etc., related to image formation. Further, the nonvolatile memory 451 stores information of the type of sheet stacked in each of the feed trays included in the sheet feeding apparatus 10, the sheet feeding unit of the second image forming apparatus 40, and the sheet feeding unit of the first image forming apparatus 20, respectively.

The RAM 452 forms a work area for temporarily storing various kinds of programs executed by the control unit 450, various kinds of data related to these programs, etc.

Further, in the RAM 452, data input from the first image forming apparatus 20 via the communication unit 46 is stored temporarily.

The DRAM control IC 455 performs control of input and output of image data to and from the image memory 456 as well as performing control of the decompression processing of compressed image data by the decompression IC 457 in accordance with instructions from the control unit 450.

For example, when job data and compressed image data are input from the communication unit 46, the DRAM control IC 455 causes the RAM 452 to store the job data and a compression memory 456*a* of the image memory 456 to store the compressed image data, respectively.

Further, when instructions to print out the compressed image data stored in the compression memory 456*a* are input from the control unit 450, the DRAM control IC 455 reads the compressed image data from the compression memory 456*a*, causes the decompression IC 457 to perform decompression processing, and causes a page memory 456*b* to store the data. Furthermore, when instructions to print out the image data stored in the page memory 456*b* are input, the DRAM control IC 455 reads the image data from the page memory 456*b* and outputs the data to the write processing unit 458.

The image memory 456 includes the compression memory 456*a* and the page memory 456*b*, both including a DRAM. The compression memory 456*a* is a memory for storing compressed image data and the page memory 456*b* is a memory for temporarily storing image data for print out.

The decompression IC 457 performs decompression processing on compressed image data.

The write processing unit 458 generates print image data for image formation based on the image data input from the DRAM control IC 455 and outputs the data to the print unit 43.

The communication unit 46 is a communication interface for connecting to a network to which each apparatus configuring the image forming system 1 is connected. For example, the communication unit 46 communicates with the first image forming apparatus 20 using an NIC etc. and also performs serial communication with the intermediate apparatus 30 and the post-processing apparatus 50.

The rocking cam drive control unit 471 generates a control signal to control the drive of the eccentric cam 384 that rocks the rocking cam 381 (see FIG. 6) under the control of the control unit 450 and sends the control signal to an eccentric cam drive unit (not shown) via the communication unit 46.

A curl straightening roller drive control unit 472 generates a control signal to control the drive of the curl straightening roller 314 configured to straighten the curl of a conveyed sheet under the control of the control unit 450, and sends the control signal to a curl straightening roller drive unit (not shown) via the communication unit 46.

A density sensor signal processing unit 473 receives a sensor signal that a density sensor 319 outputs as the result of measuring the density of an image formed on a conveyed sheet under the control of the control unit 450 via the communication unit 46, performs predetermined signal processing, and sends the signal to the control unit 450. The control unit 450 receives the signal sent from the density sensor signal processing unit 473 and adjusts the density of the image formed in the second image forming apparatus 40 based on the measurement result of the density sensor 319. As an example, the control unit 450 corrects the gamma curve of a test pattern image.

Further, the control unit 450 receives a door open/close detection signal that the door open/close detection sensor 30*d* outputs via the communication unit 46 and controls the drive of the automatic path opening mechanism 32 based on the door open/close detection signal.

Although the rocking cam drive control unit 471, the curl straightening roller drive control unit 472, and the density sensor signal processing unit 473 are explained as units separate from the control unit 450, it may also be possible for the control unit 450 to include the whole or a part of these functions.

(Jam Processing)

Next, jam processing performed in the case where a jam occurs in the intermediate apparatus 30 is explained.

Figure 11:
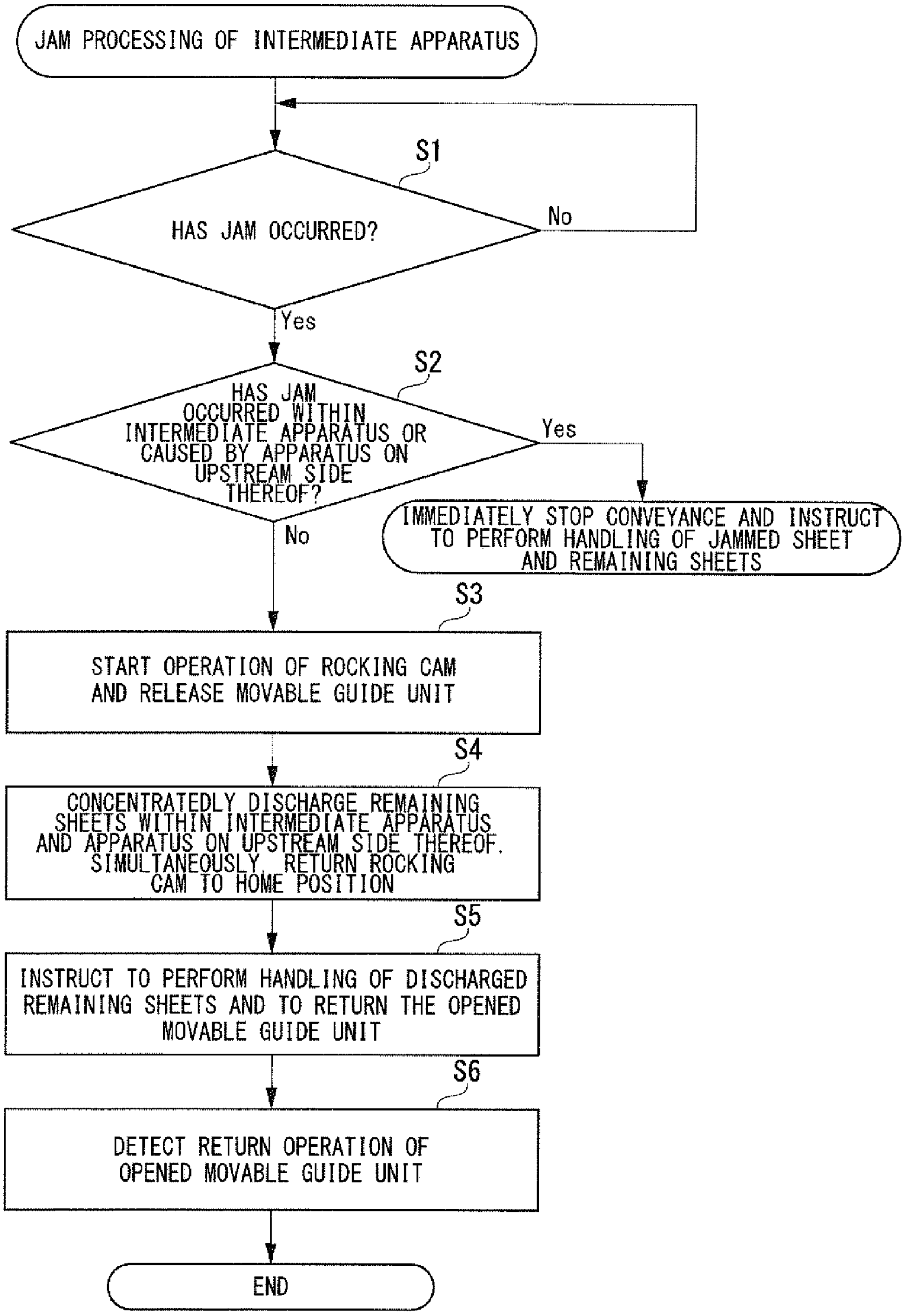
FIG. 11 is a flowchart showing jammed sheet removal processing in the intermediate apparatus.

FIG. 11 is a flowchart showing jammed sheet removal processing in the intermediate apparatus 30.

First, the control unit 450 of the second image forming apparatus 40 determines whether or not a jam has occurred in the image forming system 1 according to the presence or absence of a jam signal, and in the case where no jam has occurred, this determination processing is continued (step S1).

In the case where the determination processing at step S1 determines that a jam has occurred, the control unit 450 determines whether or not the jam has occurred within the intermediate apparatus 30 or caused by an apparatus on the upstream side thereof (for example, the first image forming apparatus 20) based on the received jam signal (step S2). In the case where the jam has occurred within the intermediate apparatus 30 or caused by an apparatus on the upstream side thereof, the control unit 450 immediately stops the conveyance of sheets and performs control to display a message to instruct a user to perform handling of the jammed sheet and remaining sheets on the LCD 221 of the operation display unit 22.

In the case where the determination processing at step S2 determines that the jam has occurred neither within the intermediate apparatus 30 nor caused by an apparatus on the upstream side thereof, the control unit 450 drives and controls the rocking cam drive control unit 471 to start the operation of the eccentric cam 384. Then, the control unit 450 rotates the eccentric cam 384 to rock the rocking cam 381 to the right and left, thereby releasing the lock state of the first movable guide unit 34 and the second movable guide unit 35 and opening the first movable guide unit 34 and the second movable guide unit 35 (step S3). Thereby, the press contact of each of the registration roller 317 and the conveyance roller 316 is released.

The control unit 450 conveys the remaining sheets within the intermediate apparatus 30 or within the apparatus on the upstream side thereof. Then, the control unit 450 discharges the remaining sheets concentratedly into the accommodation unit 33 from the sheet conveyance path 31 after the first movable guide unit 34 and the second movable guide unit 35 of the intermediate apparatus 30 are opened. At the same time, the control unit 450 returns the rocking cam 381 to the home position (step S4).

Next, the control unit 450 performs handling of the remaining sheets discharged into the accommodation unit 33 and performs control to display a message to instruct to return the first movable guide unit 34 and the second movable guide unit 35 that are opened on the LCD 221 of the operation display unit 22 (step S5).

Then, the control unit 450 detects whether or not the first movable guide unit 34 and the second movable guide unit 35 are returned to the positions (guide positions) where sheet guiding is enabled (step S6). After the processing at step S6 ends, the jam processing of the intermediate apparatus 30 is ended.

The detection of whether or not the first movable guide unit 34 and the second movable guide unit 35 are returned to the guide positions can be implemented by providing a position detection unit (not shown) configured to detect the positions of the first movable guide unit 34 and the second movable guide unit 35.

The position detection unit is provided in the vicinity of each of the first movable guide unit 34 and the second movable guide unit 35. For example, it is possible to apply a position detection switch as the position detection unit. It may also be possible to configure the position detection switch so as to detect that the position detection switch comes into contact with the first movable guide unit 34 and the second movable guide unit 35 when the first movable guide unit 34 and the second movable guide unit 35 are returned to the guide positions (lock state) and to output a detection signal to the control unit 450. Alternatively, it may also be possible to apply a rotary detection sensor (rotary encoder) to the position detection unit. It may also be possible for the rotary detection sensor to detect rotation angles of the operation units 346 and 356 or the hook units 344*a* and 354*a* and to detect the return of the first movable guide unit 34 and the second movable guide unit 35 from the rotation angles.

In this manner, when a jam occurs, the pressure contact of the registration roller 317 and that of the conveyance roller 316 are released, and therefore, it is possible to easily remove the sheet having stopped in the sheet conveyance path 31 without tearing the sheet. In the example described above, in the case where the jam has occurred within the intermediate apparatus 30 or caused by an apparatus on the upstream side thereof, the conveyance of sheets is stopped immediately and instructions to perform handling of the jammed sheet and remaining sheets are given, but the example is not limited to this. For example, it may also be possible to discharge the remaining sheets in the sheet conveyance path 31 from the position corresponding to the first movable guide unit 34 and the second movable guide unit 35 to the position where the jam has occurred on the upstream side thereof into the accommodation unit 33 by opening the first movable guide unit 34 and the second movable guide unit 35.

In the example in FIG. 11, explanation is given on the supposition that the first movable guide unit 34 and the second movable guide unit 35 are opened automatically, but it may also be possible to manually open the first movable guide unit 34 and the second movable guide unit 35.

For example, the control unit 450 determines whether or not the front door of the intermediate apparatus 30 is opened from the detection result of the door open/close detection sensor 30*d*. Then, in the case where the front door of the intermediate apparatus 30 is opened, the control unit 450 drives and controls the rocking cam drive control unit 471 and rotates the eccentric cam 384 to rock the rocking cam 381 to the right and left. Due to this processing, the lock state of the first movable guide unit 34 and the second movable guide unit 35 is released, the first movable guide unit 34 and the second movable guide unit 35 are opened, and the pressure contact of the registration roller 317 and that of the conveyance roller 316 are released. The user removes the jammed sheet discharged from the sheet conveyance path 31 and accommodated into the accommodation unit 33 and ends the jam processing.

(Registration Unit on Sheet Conveyance Path)

Next, a registration unit on the sheet conveyance path 31 is explained.

The first and second image forming apparatuses 20 and 40 and the intermediate apparatus 30 of the image forming system 1 each include a registration unit configured to correct a skew of a sheet. In the present embodiment, the second image forming apparatus 40 includes the registration roller 433*a* and the conveyance roller 434*a* as the registration unit and the intermediate apparatus 30 includes the registration roller 317 and the conveyance roller 316 as a registration unit. These registration units correct a skew of a sheet by pushing the sheet into the registration roller from the conveyance roller on the upstream side and forming a loop in the sheet between the registration roller and the conveyance roller.

As shown in FIG. 4, the registration unit of the intermediate apparatus 30 is provided on the sheet conveyance path 31 having the curved part in the shape of substantially a U-letter. The sheet conveyance path 31 of the registration unit of the intermediate apparatus 30 is curved, and therefore, the state is close to that where a loop is formed in the sheet within the sheet conveyance path 31. On the other hand, the sheet conveyance path of the registration unit of the second image forming apparatus 40 is in the shape of substantially a straight line. Consequently, the curvature of the sheet conveyance path 31 of the registration unit of the intermediate apparatus 30 is larger than that of the second image forming apparatus 40.

Hence, in the intermediate apparatus 30, a loop formation amount is made further larger than that of a loop formed in the registration unit provided on the straight sheet conveyance path of the second image forming apparatus 40. The reason is that if the loop formation amount is small within the curved sheet conveyance path 31, the pushing-in force from the conveyance roller 316 is insufficient, and therefore, it is not possible to sufficiently correct the skew of the sheet.

Figure 12:
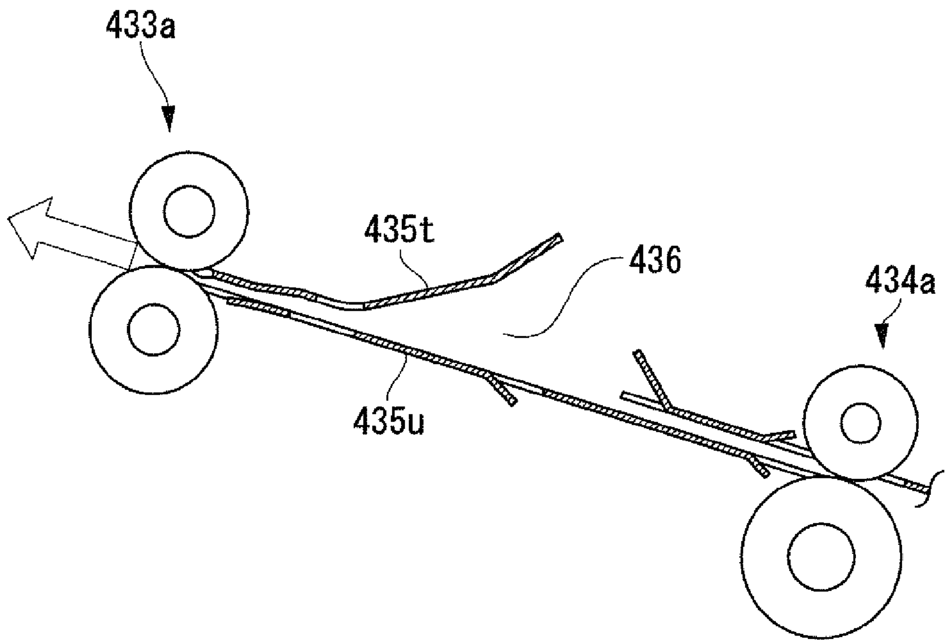
FIG. 12 is an outline configuration diagram of a registration unit of the second image forming apparatus.

FIG. 12 is an outline configuration diagram of the registration unit of the second image forming apparatus 40.

Figure 13:
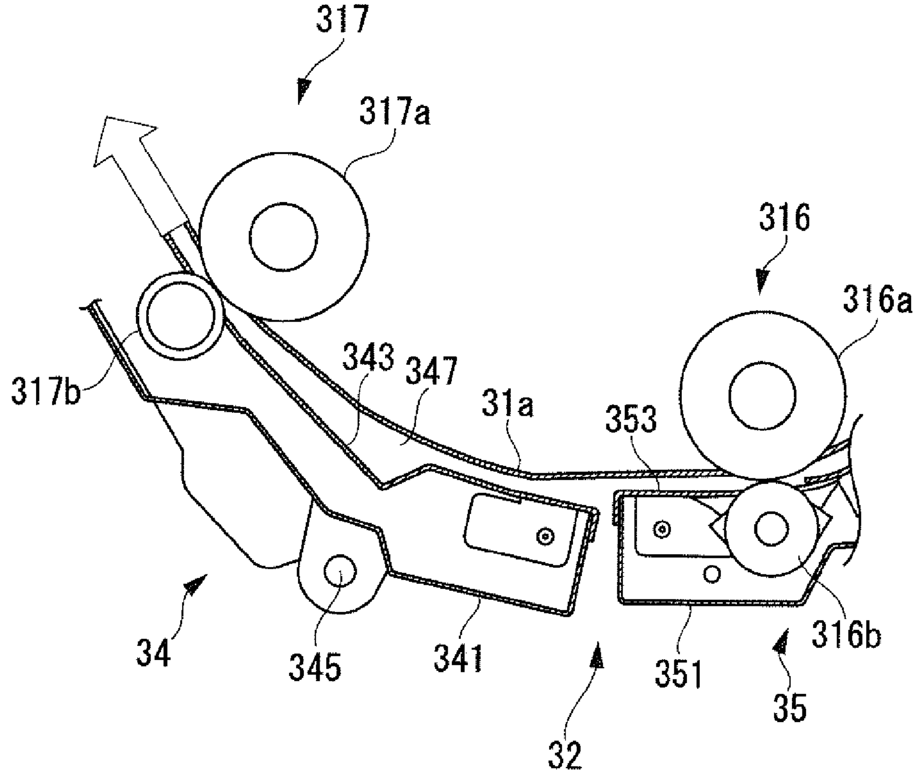
FIG. 13 is an outline configuration diagram of the registration unit of the intermediate apparatus.

FIG. 13 is an outline configuration diagram of the registration unit of the intermediate apparatus 30.

As shown in FIG. 12, the registration unit of the second image forming apparatus 40 has a lower guide unit 435*u* and an upper guide unit 435*t* each having the shape of a plate on the upstream side of the registration roller 433*a*. Between the lower guide unit 435*u* and the upper guide unit 435*t*, a loop formation space 436 in which a looped sheet is accommodated is formed.

As shown in FIG. 13, the registration unit of the intermediate apparatus 30 has the inner guide unit 31*a* and the guide unit 343 of the first movable guide unit main body 341 on the upstream side of the registration roller 317. Between the inner guide unit 31*a* and the guide unit 343, a loop formation space 347 in which a looped sheet is accommodated is formed.

Figure 14:
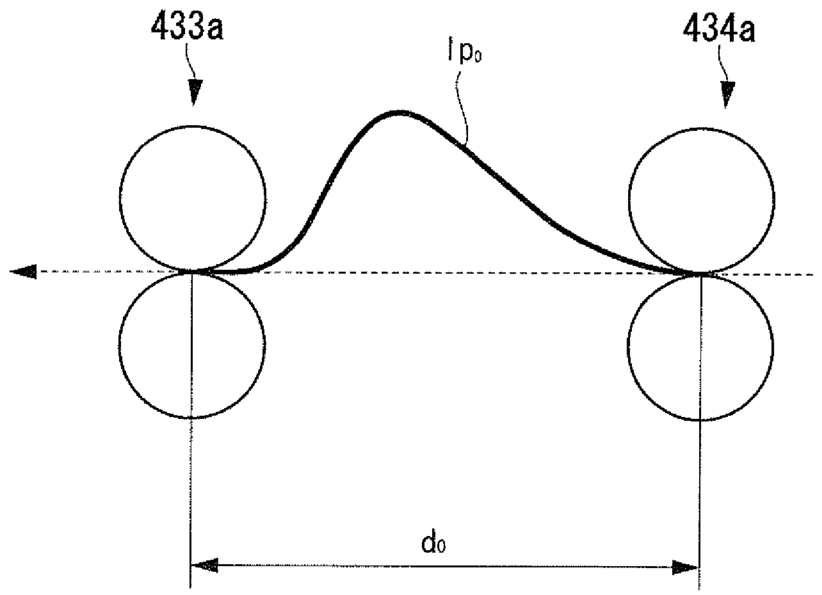
FIG. 14 is a schematic diagram for explaining a loop formed by the registration unit of the second image forming apparatus.

FIG. 14 is a schematic diagram for explaining a loop formed by the registration unit of the second image forming apparatus 40.

Figure 15:
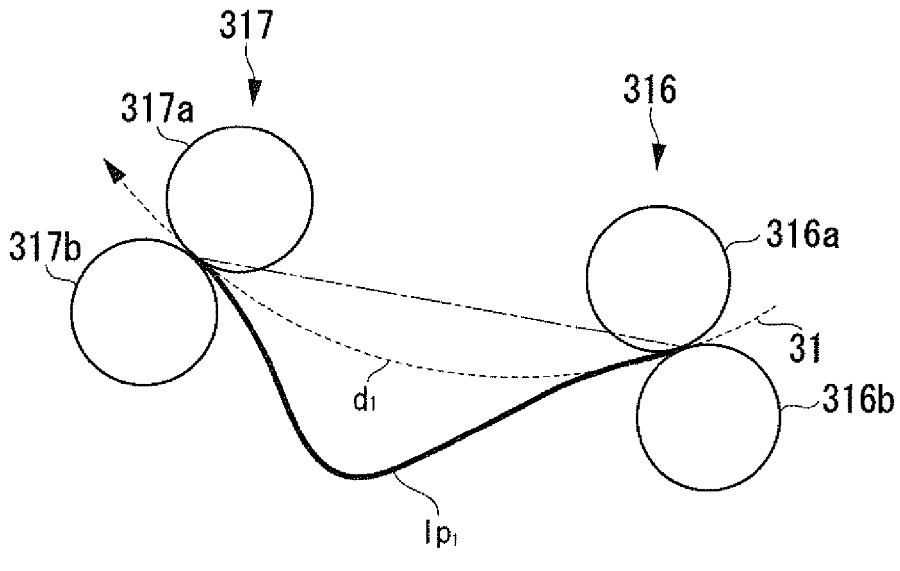
FIG. 15 is a schematic diagram for explaining a loop formed by the registration unit of the intermediate apparatus.

FIG. 15 is a schematic diagram for explaining a loop formed by the registration unit of the intermediate apparatus 30.

In the present embodiment, the loop formation amount is represented by the difference between the “loop length of a sheet (of the registration unit) between the registration roller pair and the conveyance roller pair” and the “sheet conveyance path length (of the registration unit) between the registration roller pair and the conveyance roller pair”.

The loop formation amount of the registration unit of the intermediate apparatus 30 satisfies a conditional expression below in order to make the loop formation amount of a sheet larger than that of registration unit of the second image forming apparatus 40.

$$\frac{lp_0 - d_0}{d_0} < \frac{lp_1 - d_1}{d_1} \quad \text{[Mathematical expression 1]}$$

where $lp_0$, $d_0$, $lp_1$, and $d_1$ are as follows.

$lp_0$: Loop length of a sheet in the registration unit of the second image forming apparatus 40

$d_0$: Sheet conveyance path length from the nip portion of the registration roller 433*a* to the nip portion of the conveyance roller 434*a* in the registration unit of the second image forming apparatus 40

$lp_1$: Loop length of a sheet in the registration unit of the intermediate apparatus 30

$d_1$: Sheet conveyance path length from the nip portion of the registration roller 317 to the nip portion of the conveyance roller 316 in the registration unit of the intermediate apparatus 30

As described above, in the registration unit of the intermediate apparatus 30, the loop formation amount given to a sheet is made larger than that in the registration unit of the image forming apparatus on the downstream side (the second image forming apparatus 40). Due to this, it is possible to secure the skew correction ability for a sheet also in the curved sheet conveyance path 31.

It is desirable to make the loop formation space 347 of the registration unit of the intermediate apparatus 30 larger than the loop formation space 436 of the registration unit of the second image forming apparatus 40. By doing so, the amount of feed of a sheet by the conveyance roller is increased and the loop formation amount is increased.

As shown in FIG. 13, the guide unit 343 on the downstream side and the guide unit 353 on the upstream side configuring the registration unit of the intermediate apparatus 30 are divided and it is desirable to make the gap between the guide unit 343 on the downstream side and the inner guide unit 31*a* wider than that between the guide unit 353 on the upstream side and the inner guide unit 31*a*. By doing so, a margin is given to the loop formation space.

[Modification Example of Image Forming System]

Figure 16:
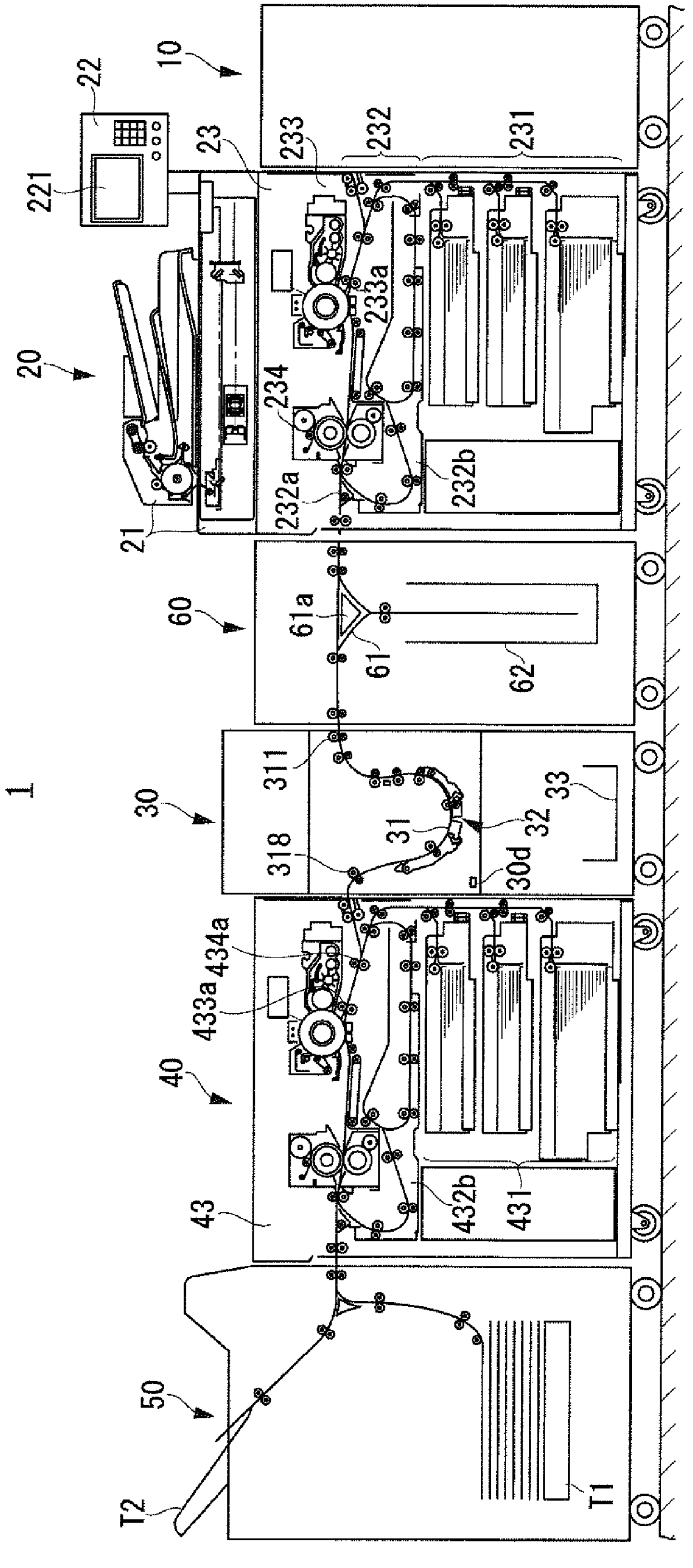
FIG. 16 is an outline diagram showing a modification example of the entire configuration of the image forming system according to the embodiment of the present invention.

FIG. 16 is an outline diagram showing a modification example of the entire configuration of the image forming system 1 according to an embodiment of the present invention.

In the image forming system 1 shown in FIG. 16, an intermediate apparatus 60 is arranged between the first image forming apparatus 20 and the intermediate apparatus 30. That is, the intermediate apparatus 60 is arranged, in the sheet conveyance direction, on the downstream side of the first image forming apparatus 20 and on the upstream side of the intermediate apparatus 30. In the present embodiment, the intermediate apparatus 60 conveys a sheet conveyed from the first image forming apparatus 20 to the intermediate apparatus 30 in accordance with instructions from the first image forming apparatus 20.

The intermediate apparatus 60 includes a reverse unit 61 having a conveyance path switch unit 61*a*, a reverse roller, etc., a stack unit 62 configured to stack sheets on which images are already formed, etc.

In the case where it is necessary to reverse the front side and the back side of a sheet to be conveyed to the intermediate apparatus 30, by the switching operation of the conveyance path switch unit 61*a*, the sheet conveyed from the first image forming apparatus 20 is conveyed to the reverse unit 61 and the front side and the back side of the sheet are reversed through a switch back by the reverse roller of the reverse unit 61 and then the sheet is conveyed to the intermediate apparatus 30.

In the case where it is not necessary to reverse the front side and the back side of the sheet, the sheet conveyed from the first image forming apparatus 20 is not conveyed to the reverse unit 61 by the switching operation of the conveyance path switch unit 61*a* and is conveyed to the intermediate apparatus 30 without reversing of the front side and the back side.

In the case where it is necessary to temporarily stack the sheet conveyed from the first image forming apparatus 20, the sheet conveyed from the first image forming apparatus 20 is stacked in the stack unit 62 temporarily. It may also be possible for the intermediate apparatus 60 to include a discharge tray to discharge the sheet conveyed from the first image forming apparatus 20.

As above, the embodiments to which the invention made by the present inventors is applied are explained. However, the present invention is not limited by the descriptions and drawings forming a part of the disclosure of the invention by the above-described embodiments and there can be various kinds of embodiments within the scope not deviating from the gist of the invention described in the claims.

In the above-described embodiments, the serial tandem image forming system 1 including the first and second image forming apparatuses 20 and 40 is explained, but it may also be possible to configure a serial tandem image forming system using three or more image forming apparatuses. In this case, among a plurality of image forming apparatuses configuring the image forming system, the image forming apparatus provided on the uppermost stream side in the sheet conveyance direction is set as the main machine and the other image forming apparatuses other than the main machine are set as sub machines.

Further, in the embodiments described above, the configuration is explained in which the intermediate apparatus 30 includes the automatic path opening mechanism 32 and the first and second movable guide units 34 and 35 of the automatic path opening mechanism 32 are opened automatically triggered by the opening of the front door, but they may be opened manually.

For example, it may also possible to adopt a configuration in which a handle is provided in a position that can be seen by a user when the front door of the intermediate apparatus 30 is opened and by the operation of the handle of the user, the eccentric cam 384 rotates to rock the rocking cam 381, thereby releasing the lock state of the first and second movable guide units 34 and 35. Alternatively, it may also be possible to adopt a configuration in which an operation screen to open the first and second movable guide units 34 and 35 is displayed on the LCD 221 of the operation display unit 22 and the lock state of the first and second movable guide units 34 and 35 is released triggered by an operation signal input by a user to a touch panel.

Further, in the embodiments described above, the configuration is explained in which the automatic path opening mechanism 32 includes the first movable guide unit 34 and the second movable guide unit 35, but it may also be possible to integrally configure the first movable guide unit 34 and the second movable guide unit 35. That is, a configuration is adopted in which in one movable guide unit, the driven roller 317*b* of the registration roller 317 and the driven roller 316*b* of the conveyance roller 316, which is also the loop formation roller, are arranged and the movable guide unit can rotate around the rotation shaft in the vicinity of the sheet conveyance path 31. By the rotation of the movable guide unit, the driven roller 317*b* of the registration roller 317 and the driven roller 316*b* of the conveyance roller 316 move integrally with the movable guide unit and both the pressure contact of the registration roller 317 and the pressure contact of the conveyance roller 316 are released together.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming system comprising:
- a first image forming apparatus arranged on an upstream side in a sheet conveyance direction;
- a second image forming apparatus arranged on a downstream side in the sheet conveyance direction;
- an intermediate apparatus arranged between the first image forming apparatus and the second image forming apparatus, the intermediate apparatus not having a reverse unit to reverse a front side and a back side of a sheet; and
- a sheet conveyance path provided in the intermediate apparatus, through which a sheet is conveyed from the first image forming apparatus to the second image forming apparatus, wherein
- a rear end of a sheet not having been reversed in the intermediate apparatus and having been stopped on the sheet conveyance path is located on the sheet conveyance path of the intermediate apparatus, and
- a tip end of the sheet not having been reversed in the intermediate apparatus and having been stopped on the sheet conveyance path is located on a sheet conveyance path within the second image forming apparatus.

2. The image forming system according to claim 1, wherein the sheet conveyance path of the intermediate apparatus curves.

3. The image forming system according to claim 2, wherein on the sheet conveyance path of the intermediate apparatus, a curl straightening unit configured to straighten a curl of a sheet to be conveyed is provided.

4. The image forming system according to claim 2, wherein the intermediate apparatus includes a density sensor configured to measure a density of an image formed on a sheet to be conveyed, in a vicinity of the sheet conveyance path, and wherein the second image forming apparatus adjusts a density of an image to be formed by the second image forming apparatus based on a measurement result of the density sensor.

5. The image forming system according to claim 2, wherein the sheet conveyance path of the intermediate apparatus is curved in a downward direction.

6. The image forming system according to claim 1, wherein a second intermediate apparatus is arranged between the first image forming apparatus and the intermediate apparatus, and wherein in a case where the second intermediate apparatus is arranged, the intermediate apparatus conveys a sheet conveyed from the second intermediate apparatus to the second image forming apparatus, and the sheet conveyance path of the intermediate apparatus has such a length that, in a case where a sheet stop operation is performed on the sheet conveyance path of the intermediate apparatus or a sheet conveyance path of the second image forming apparatus, a rear end of a sheet, to which the sheet stop operation has been performed, is not included in the second intermediate apparatus.

7. The image forming system according to claim 1, wherein the first image forming apparatus includes a plurality of feed trays, and a rear end of a sheet having been fed from the feed trays and stopped on the sheet conveyance path is located on the sheet conveyance path of the intermediate apparatus.

8. An image forming system comprising:
- a first image forming apparatus arranged on an upstream side in a sheet conveyance direction;
- a second image forming apparatus arranged on a downstream side in the sheet conveyance direction;
- an intermediate apparatus arranged between the first image forming apparatus and the second image forming apparatus, the intermediate apparatus not having a reverse unit to reverse a front side and a back side of a sheet; and a sheet conveyance path provided in the intermediate apparatus, through which a sheet is conveyed from the first image forming apparatus to the second image forming apparatus, wherein a rear end of a sheet not having been reversed in the intermediate apparatus and having been stopped on the sheet conveyance path is located on the sheet conveyance path of the intermediate apparatus, and a tip end of the sheet not having been reversed in the intermediate apparatus and having been stopped on the sheet conveyance path is located on a sheet conveyance path within the second image forming apparatus, and a tip end of the sheet not having been reversed in the intermediate apparatus and having been stopped on the sheet conveyance path is located on the sheet conveyance path of the intermediate apparatus.

9. The image forming system according to claim 8, wherein the intermediate apparatus includes a registration roller, and a position of the registration roller is set as a sheet stop position.

10. The image forming system according to claim 8, wherein the sheet conveyance path of the intermediate apparatus curves.

11. The image forming system according to claim 10, wherein on the sheet conveyance path of the intermediate apparatus, a curl straightening unit configured to straighten a curl of a sheet to be conveyed is provided.

12. The image forming system according to claim 10, wherein the intermediate apparatus includes a density sensor configured to measure a density of an image formed on a sheet to be conveyed, in a vicinity of the sheet conveyance path, and wherein the second image forming apparatus adjusts a density of an image to be formed by the second image forming apparatus based on a measurement result of the density sensor.

13. The image forming system according to claim 10, wherein the sheet conveyance path of the intermediate apparatus is curved in a downward direction.

14. The image forming system according to claim 8, wherein a second intermediate apparatus is arranged between the first image forming apparatus and the intermediate apparatus, and wherein in a case where the second intermediate apparatus is arranged, the intermediate apparatus conveys a sheet conveyed from the second intermediate apparatus to the second image forming apparatus, and the sheet conveyance path of the intermediate apparatus has such a length that, in a case where a sheet stop operation is performed on the sheet conveyance path of the intermediate apparatus or a sheet conveyance path of the second image forming apparatus, a rear end of the a sheet, to which the sheet stop operation has been performed, is not included in the second intermediate apparatus.

15. The image forming system according to claim 8, wherein the first image forming apparatus includes a plurality of feed trays, and a rear end of a sheet having been fed from the feed trays and stopped on the sheet conveyance path is located on the sheet conveyance path of the intermediate apparatus.

16. An intermediate apparatus arranged between a first image forming apparatus and a second image forming apparatus and which conveys a sheet conveyed from the first image forming apparatus to the second image forming apparatus, wherein a sheet conveyance path of the intermediate apparatus is formed so that a rear end of a sheet having stopped on the sheet conveyance path is located on the sheet conveyance path within the intermediate apparatus, and a tip end of the sheet not having been reversed in the intermediate apparatus and having been stopped on the sheet conveyance path is located on a sheet conveyance path within the second image forming apparatus, and wherein the intermediate apparatus does not have a reverse unit to reverse a front side and a back side of a sheet.

17. The intermediate apparatus according to claim 16, wherein the sheet conveyance path of the intermediate apparatus curves.

18. The intermediate apparatus according to claim 17, wherein on the sheet conveyance path of the intermediate apparatus, a curl straightening unit configured to straighten a curl of a sheet to be conveyed is provided.

19. The intermediate apparatus according to claim 17, further comprising a density sensor configured to measure a density of an image formed on a sheet to be conveyed in a vicinity of the sheet conveyance path of the intermediate device, wherein the second image forming apparatus adjusts a density of an image to be formed by the second image forming apparatus based on a measurement result of the density sensor.

20. The intermediate apparatus according to claim 17, wherein the sheet conveyance path of the intermediate apparatus is curved in a downward direction.

21. The intermediate apparatus according to claim 16, wherein a second intermediate apparatus is arranged between the first image forming apparatus and the intermediate apparatus, and wherein in a case where the second intermediate apparatus is arranged, the intermediate apparatus conveys a sheet conveyed from the second intermediate apparatus to the second image forming apparatus, and the sheet conveyance path of the intermediate apparatus has such a length that, in a case where a sheet stop operation is performed on the sheet conveyance path of the intermediate apparatus or a sheet conveyance path of the second image forming apparatus, a rear end of a sheet, to which the sheet stop operation has been performed, is not included in the second intermediate apparatus.

22. The intermediate apparatus according to claim 16, wherein the first image forming apparatus includes a plurality of feed trays, and a rear end of a sheet having been fed from the feed trays and stopped on the sheet conveyance path is located on the sheet conveyance path of the intermediate apparatus.

23. An intermediate apparatus arranged between a first image forming apparatus and a second image forming apparatus and which conveys a sheet conveyed from the first image forming apparatus to the second image forming apparatus, wherein a sheet conveyance path of the intermediate apparatus is formed so that a rear end of a sheet having stopped on the sheet conveyance path is located on the sheet conveyance path within the intermediate apparatus, a tip end of the sheet not having been reversed in the intermediate apparatus and having been stopped on the sheet conveyance path is located on the sheet conveyance path of the intermediate apparatus, and the intermediate apparatus does not have a reverse unit to reverse a front side and a back side of a sheet.

24. The intermediate apparatus according to claim 23, wherein the intermediate apparatus includes a registration roller, and a position of the registration roller is set as a sheet stop position.

25. The intermediate apparatus according to claim 23, wherein the sheet conveyance path of the intermediate apparatus curves.

26. The intermediate apparatus according to claim 25, wherein on the sheet conveyance path of the intermediate apparatus, a curl straightening unit configured to straighten a curl of a sheet to be conveyed is provided.

27. The intermediate apparatus according to claim 25, further comprising a density sensor configured to measure a density of an image formed on a sheet to be conveyed in a vicinity of the sheet conveyance path of the intermediate device, wherein the second image forming apparatus adjusts a density of an image to be formed by the second image forming apparatus based on a measurement result of the density sensor.

28. The image forming system according to claim 25, wherein the sheet conveyance path of the intermediate apparatus is curved in a downward direction.

29. The intermediate apparatus according to claim 23, wherein a second intermediate apparatus is arranged between the first image forming apparatus and the intermediate apparatus, and wherein in a case where the second intermediate apparatus is arranged, the intermediate apparatus conveys a sheet conveyed from the second intermediate apparatus to the second image forming apparatus, and the sheet conveyance path of the intermediate apparatus has such a length that, in a case where a sheet stop operation is performed on the sheet conveyance path of the intermediate apparatus or a sheet conveyance path of the second image forming apparatus, a rear end of a sheet, to which the sheet stop operation has been performed, is not included in the second intermediate apparatus.

30. The image forming system according to claim 23, wherein the first image forming apparatus includes a plurality of feed trays, and a rear end of a sheet having been fed from the feed trays and stopped on the sheet conveyance path is located on the sheet conveyance path of the intermediate apparatus.

31. An intermediate apparatus arranged between a first image forming apparatus and a second image forming apparatus and which conveys a sheet from the first image forming apparatus to the second image forming apparatus, wherein a sheet conveyance path of the intermediate apparatus is formed so that a rear end of a sheet having been stopped on the sheet conveyance path is located on the sheet conveyance path of the intermediate apparatus, a density sensor configured to measure a density of an image formed on a sheet to be conveyed is provided in a vicinity of the sheet conveyance path, and the second image forming apparatus adjusts a density of an image to be formed by the second image forming apparatus, based on a measurement result of the density sensor.

32. The intermediate apparatus according to claim 31, wherein a tip end of the sheet having been stopped on the sheet conveyance path is located on a sheet conveyance path of the second image forming apparatus.

* * * * *